United States Patent
Gupta et al.

(10) Patent No.: US 10,448,072 B1
(45) Date of Patent: Oct. 15, 2019

(54) SYSTEMS AND METHODS FOR INCREASING A LIKELIHOOD OF MEDIA ASSET CONSUMPTION USING RECOMMENDATION CHAINS

(71) Applicant: Rovi Guides, Inc., San Jose, CA (US)

(72) Inventors: Vikram Makam Gupta, Bangalore (IN); K Vishnu Vardhan, Tirupati (IN); Vishwas Sharadanagar Panchaksharaiah, Karnataka (IN); Srikanth Channapragada, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/933,829

(22) Filed: Mar. 23, 2018

(51) Int. Cl.
*H04N 21/25* (2011.01)
*H04N 21/442* (2011.01)

(52) U.S. Cl.
CPC ..... *H04N 21/251* (2013.01); *H04N 21/44204* (2013.01)

(58) Field of Classification Search
CPC ........................ H04N 21/251; H04N 21/44204
USPC .......................................................... 725/14
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2005/0251827 A1 | 11/2005 | Ellis et al. | |
| 2010/0138867 A1* | 6/2010 | Wong | G06F 17/30749 725/46 |
| 2010/0153885 A1 | 6/2010 | Yates | |
| 2014/0082670 A1* | 3/2014 | Papish | H04N 21/4532 725/45 |
| 2015/0365725 A1* | 12/2015 | Belyaev | H04N 21/458 725/46 |

* cited by examiner

*Primary Examiner* — Alfonso Castro
(74) *Attorney, Agent, or Firm* — Haley Guiliano LLP

(57) ABSTRACT

Systems and methods are described herein increasing a likelihood above a target threshold of a user watching a target media asset. The method includes selecting a target media asset, identifying a media attribute present in the target media asset that does not match a user profile, computing a percentage of the media attribute present in the target media asset relative to other media attributes present in the target media asset, searching for a first media asset that comprises a first amount of the media attribute less than the percentage by a first threshold. Upon determining that the user consumes the first media asset, repeating the process with a second media asset that comprises a second amount of the media attribute greater than the first threshold and less than the percentage by a second threshold. After the user consumes the second media asset, recommending the target media asset to the user.

20 Claims, 10 Drawing Sheets

SYSTEMS AND METHODS FOR INCREASING A LIKELIHOOD OF MEDIA ASSET CONSUMPTION USING RECOMMENDATION CHAINS

BACKGROUND

Traditional media systems recommend content in accordance with user preferences recorded in a user profile associated with the user. Traditional systems avoid recommending content inconsistent with preferences in the user profile. For example, a user may have recorded a preference of dislike for content with a particular attribute (e.g. violence) at a certain time in the past. Based on this preference, a media guidance application may not recommend violent movies ('Silence of the Lambs') to the user based on this received preference. In some cases, a provider may wish to promote a media asset inconsistent with the profile (e.g., 'American Psycho', a violent movie). Selection of that promotion by the user is unlikely because the user is disinterested because of the violent nature of the media asset. The user may pick the promoted media asset only in the unlikely scenario when he feels adventurous. Such systems fail to effectively expose the user to new media as the user will continue viewing content they are most comfortable with and thus the user does not optimally consume content.

SUMMARY

Accordingly, systems and methods are provided herein to increase a likelihood that a user will watch a media asset with a particular media attribute (e.g. graphical violence) despite a previous preference associated with the user indicating a dislike for the media attribute (e.g., 'violence'). For example, the user may register a preference of disliking 'graphical violence' in the past. In some examples, the media guidance application may infer a user preference of dislike towards violence based on media assets consumed by the user. Based on this preference, the media guidance application may not recommend a movie 'American Psycho' that may be recently made available to the user. In order to increase a likelihood of the user to watch 'American Psycho', the media guidance application, may create a recommendation chain, where each consecutive movie in the chain may include a gradual increase of the 'graphical violence' in a movie.

In order to prime the user to watch 'American Psycho', the media guidance application may determine an amount of time of the movie 'American Psycho that has 'graphic violence.' Based on the calculated amount of 'violence', the media guidance application may search for and recommend a chain of media assets that have a gradual increase in the amount of 'violence' to the amount of 'graphical violence' present in the movie 'American Psycho'. When the user watches the media assets in the order recommended by the media guidance application, the likelihood that the user may watch 'American Psycho' has increased and the user may make an informed decision about watching the movie.

In some aspects, the media guidance application may increase a likelihood of a user watching a target media asset above a target threshold.

The media guidance application may select a target media asset to recommend to the user. For example, the media guidance application may select a media asset that is recently made available to the user as a target media asset. The movie 'American Psycho' may recently be made available to the user as part of their subscription service at a video on-demand service. In order to increase the viewership of the movie 'American Psycho', the media guidance application may select 'American Psycho' a target media asset. In some examples, there may be a scheduled television broadcast of the movie 'American Psycho', for which the user may want to be prepared and may request the media guidance application to come up with a chain of media asset recommendations that may prepare the user for the movie 'American Psycho'.

In order to make useful recommendations, the media guidance application first determines the likelihood that the user may watch the target media asset. For example, the media guidance application may determine the likelihood of the user watching 'American Psycho'. In such examples, the calculation of the likelihood may be based on a profile associated with the user that may include a viewing history, preferences, and other attributes associated with the user. In some examples, the user may determine that a likelihood that the user will watch 'American Psycho' is 25%.

The media guidance application determines a set of media attributes present in the target media asset. For example, the media guidance application may use metadata associated with each scene of the movie 'American Psycho' to determine dominating traits of each scene in the movie. Each scene in the movie may be classified in various ways, like 'Drama', 'Action', 'Adventure', 'Romantic', 'Classic', 'Violence'. The traits that occur most often in the movie, may be used to define the movie as a whole. Thus, in this example, the movie 'American Psycho' may be classified as 'Classic', 'Drama', 'Violence', etc.

The media guidance application may identify a media attribute from the set of media attributes present in the target media asset that does not match the user profile. For example, the media guidance application may analyze the user profile and compare the attributes associated with the movie 'American Psycho'. The preferences of the user may be recorded based on the media assets consumed by the user. The preferences may also be inferred from other media assets that the user has previously 'liked' or 'disliked'. In this example, the media guidance application may determine that the attribute 'violence' of 'American Psycho' is associated with the user profile in a negative form, as an attribute disliked by the user. In such examples, the user may have expressed an explicit dislike towards 'violence' and therefore the media guidance application may not recommend 'American Psycho' to the user.

The media guidance application determines a first length of the target media asset, determines a second length of a portion of the target media asset in which the media attribute is present, and computes a ratio of the first length of to the second length to determine a percentage of the media attribute present in the target media asset. For example, the media guidance application may determine a first length of the movie 'American Psycho' and a second length of the 'violence' attribute present in the movie. The media guidance application may determine the second length of the 'violence' attribute by determining a collective length of the scenes associated with the 'violence' attribute. In this example, the media guidance application may determine a ratio of the length of the 'violent' part of the film to the length of the film, to determine a percentage of the movie that is considered 'violent.' In this example, 'American Psycho' may be determined to have scenes of 'violence' that have a total length 45 minutes of a one hour 45-minute movie. Therefore, the media guidance application may determine that 43% of 'American Psycho' is 'violent.'

The media guidance application begins collecting media assets to produce recommendation chains to prime the user for 'American Psycho.' The media guidance application may determine a first set of media assets with a likelihood of the user watching each media asset in the first set of media assets that is above the target threshold. For example, the media guidance application may only recommend media assets to the user if the media guidance application determines that the likelihood of the user watching the media asset is above the target likelihood value. The target likelihood value may be a numerical value (e.g., 70%, 75%). In this example, the media guidance application may start the process of manufacturing recommendation chains for the user by determining a first set of media assets, where each media asset has a likelihood of the user watching the media asset that is higher than the target likelihood.

The first set of media assets may include movies, television programs, podcasts, videos among other programs that have a likelihood higher than the target likelihood of the user watching the first set of media assets.

From the first set of media assets, the media guidance application may determine a first media asset of the recommendation chain to be recommended to the user. The media guidance application analyses each media asset within the first set of media assets to determine a ratio of a length each media asset with the media attribute to the length of the each media asset to compute a first intermediate percentage of media attribute present in the each media asset. For example, the media guidance application may determine a level of 'violence' in each media asset of the first set of media assets. As the user does not prefer the 'violence' attributes, all of the media assets in the first set of media assets may have little or no violence in them. Some media assets recommended in this example may be 'Toy Story', 'The Prestige', 'Cast Away', 'You Have Got Mail', and 'Forrest Gump'. For example, using the ratio of the length of 'violence' in the movie to the length of the movie as described above, the media guidance application may determine that the movie 'You Have Got Mail' has no 'violence' (0%), the movie 'Toy Story' is an animated movie with 2% 'violence', the movie 'Forrest Gump' has 4% 'violence', the movie 'Cast Away' has 5% 'violence', and the movie 'The Prestige' has 7% 'violence.'

In the first set of media assets with little or no violence, the media guidance application may select the media asset with the highest level of 'violence'. The media guidance application compares the computed first intermediate percentages of each media asset to determine a first media asset with a maximum first intermediate percentage of the media attribute less than the percentage by a first threshold. For example, based on the computed percentages of 'violence' in each media asset in the first set of media assets, the media guidance application may select the movie 'The Prestige' to recommend to the user.

The media guidance application may generate for display a first recommendation of the first media asset. For example, the media guidance application may recommend the 'The Prestige' to the user as the next media asset. The recommendation may be provided as an alert to a user device associated with the user.

The media guidance application, in response to determining that the user has consumed the first media asset, increases the likelihood of the user watching the target media asset to an intermediate value greater than the determined likelihood and less than the target likelihood. For example, the media guidance application, upon determining that the user has watched 'The Prestige', may increase the likelihood that the user will watch 'American Psycho' from the previously computed 25% to 50%.

Now, based on the fact that the user has consumed the 'The Prestige', the media guidance application may begin to determine a second set of media movies that are related to the first movie. The media guidance application may determine a second set of media assets related to the first media asset. For example, the media guidance application may recommend movies such as 'The Dark Knight, Memento', 'Now You See Me'. The relation between the first movie and the second set of movies may be based on a similarity in actors, director, genre, theme, among others.

The media guidance application may analyze each media asset within the second set of media assets to determine a ratio of a length each media asset with the media attribute to the length of each media asset to compute a second intermediate percentage of media attribute present in the each media asset, wherein the second intermediate percentage is greater than the maximum first intermediate percentage. For example, as with the first set of media assets, the media guidance application may determine using the ratios of the length of the attribute in the media asset to the length of the media asset, the media asset with the highest level of 'violence' from the second set of media assets. From the determined ratios, the media guidance application may compare the computed second intermediate percentages of each media asset to determine a second media asset with a maximum second intermediate percentage.

For example, the media guidance application may determine that the movie 'Memento' is a movie with 30% 'violence', the movie 'The Dark Knight' has 40% 'violence', and the movie 'Now You See Me' has 25% 'violence.' In such examples, the media guidance application may select the movie 'The Dark Knight' to recommend to the user.

The media guidance application may generate for display a second recommendation of the second media asset. For example, based on the computed percentage of 'violence' for each media asset in the second set of media assets, the media guidance application may recommend the 'The Dark Knight' to the user as the next media asset. The recommendation may be provided as an alert to the user device associated with the user.

Upon determining that the user has consumed the 'The Dark Knight' movies, the media guidance application may now determine that the user is ready to watch 'American Psycho'. The media guidance application in response to determining that the user consumes the second media asset, increases the likelihood of the user watching the target media asset to a value greater than the target likelihood, and in response to the increased likelihood, recommend the target media asset to the user. For example, the media guidance application may increase the likelihood that the user will watch 'American Psycho' from 50% to 77%. In some embodiments, the user may configure the media guidance such that the user may only want content to be recommended if the likelihood score of the content is greater than 75%. Based on this increase, the media guidance application may recommend the movie 'American Psycho' to the user for consumption.

In some embodiments, the media guidance application determines the second length of the portion of the target media asset in which the media attribute is present by identifying metadata describing attributes of a plurality of scenes of the target media asset. Each scene in the media asset may have metadata associated with it. The metadata associated with each scene may indicate attributes highlighted in the scene. For example, the metadata associated with scenes in the movie may include identifiers of the scene like 'action', 'romance', 'violence', 'drama' etc.

From the metadata, the media guidance application determines a subset of scenes from the plurality of scenes with metadata that include the media attribute. For example, the media guidance application may determine a subset of scenes of the movie 'American Psycho' that are all associated with the media attribute 'violence'.

The media guidance application determines a length of each scene of the subset of scenes and adds the determined lengths of each scene of the subset of scenes to calculate the second length of the target media asset. For example, the media guidance application may determine the length of each scene in the subset of scenes of 'American Psycho' that are associated with the label of 'violence' and add the length of each of the scenes to determine a length of the 'violent' portion of the movie. In this example, the media guidance application may determine that the movie 'American Psycho' has 45 minutes of violence.

In some embodiments, the preference of the user may be recorded based on inputs received from the user regarding a different media asset. The media guidance application determines from a previously received indication from the user, that the user is not interested in a third media asset. For example, while the user has not seen 'American Psycho' previously, the user may have seen a different movie like 'Silence of the Lambs' and disliked it. The preference may be recorded in the profile by the media guidance application.

The media guidance application determines a plurality of attributes in the third media asset and compares the plurality of attributes in the third media asset to the media attribute to determine whether the media attribute is part of the third media asset. For example, the media guidance application determines that the movie 'Silence of the Lambs' has many attributes like 'drama', 'classic', violence' etc. associated with the metadata of the movie. In this example, the media guidance application may determine that the attribute of 'violence' in the movie the 'Silence of the Lambs' is a dominating attribute and therefore may designate 'Silence of the Lambs' to be a 'violent' movie, based on the metadata associated with the movie.

The media guidance application, identifies that the media attribute matches between the target media asset and the third media asset based on the comparison. For example, given that the media guidance application has determined that the movie 'Silence of the Lambs' is 'violent', the media guidance application determines that the media attribute of 'violence' is common between the 'American Psycho' and 'Silence of the Lambs.'

In some embodiments, in response to determining that the media attribute is part of the third media asset, the media guidance application determines that the media attribute does not match the user profile. For example, once the media guidance application determines that the 'Silence of the Lambs' is a 'violent' movie, disliked by the user, the media guidance application determines that the attribute of 'violence' does not match the user profile.

In some embodiments, the media guidance application increases the likelihood of the user watching the target media asset. The media guidance application determines that the user has viewed the first media asset and the second media asset. For example, the media guidance application may keep of track of whether the user has watched the recommended first media asset 'The Prestige' and the second media asset, the 'The Dark Knight' movies. In some examples, the user may not watch the entirety of the first and second media assets. In such examples, if the media guidance determines that the user has watched those scenes of the first and second media assets that correspond to the media attribute, the media guidance application may increase the likelihood that the user will view the target media asset.

In response to determining that the user has viewed the first media asset and the second media asset, the media guidance application revaluates a second likelihood that the user is interested in the third media asset. For example, based on the fact that the user has watched 'The Prestige' and the 'The Dark Knight', the media guidance application is now recalculates the likelihood that the user will watch the 'American Psycho'.

The media guidance application determines that the second likelihood is above the target threshold, and in response to determining that the second likelihood is above the target threshold, the media guidance application reverses an indication related to the media attribute in the user profile to state that the media attribute matches the user profile. For example, because the user has now watched and liked movies with 'violence', like "The Prestige' and 'The Dark Knight', the media guidance application may determine that the likelihood of the user to watch the 'American Psycho' may be above the target threshold of 75%. In case the likelihood is above the threshold, the media guidance application may now associate the 'violence' attribute to the user profile in a positive way to indicate a user preference for the attribute. In some embodiments, the media guidance application may recommend the 'American Psycho' to the user.

In some embodiments, the media guidance application may determine whether the user is able to consume the first media asset and the second media asset before a target release date of the target media asset, based on a viewing pattern of the user associated with the user profile. For example, the media guidance application may determine that the movie 'American Psycho' is being made available to the user in two days' time. The media guidance application may also determine that the user watches 1 hour of television a day. Therefore, the user may not be able to consume both movies in the given period of time before the 'American Psycho' is made available to the user.

In some embodiments, in response to determining that the user is unable to consume the first media asset and the second media asset before the target release date of the target media asset, the media guidance application analyses each respective media asset within the first set of media assets and the second set of media assets to determine a respective ratio of a combined length of a plurality of scenes with metadata that include the media attribute to the length of each respective media asset. For example, upon determining that the user may not be able to watch 'The Prestige' and 'The Dark Knight' before the 'American Psycho' is available to the user, the media guidance application may search through the first set of media assets and the second set of media assets to determine the ratio of the length of 'violent' scenes in a movie to the length of the movie for each movie in the first set and the second set. In this example, the first set and the second set of movies together include movies like 'Toy Story', 'The Prestige', 'Cast Away', 'You Have Got Mail', 'Forrest Gump', 'The Dark Knight', 'Memento', and 'Now You See Me'.

The media guidance application may compute a third intermediate percentage of media attribute using the determined respective ratio of each respective media asset, wherein the computed third intermediate percentage is greater than the maximum first intermediate percentage and less than the maximum second intermediate percentage. For example, as described previously, the media guidance application may determine that in the first set of media assets, the movie You Have Got Mail' has no violence (0%), the movie 'Toy Story' is an animated movie with 2% 'violence', the movie 'Forrest Gump' has 4% 'violence', and the movie 'Cast Away' has 5% 'violence.' Additionally, the media guidance application may determine that in the second set of movies, the movie the movie 'Memento' is a movie with 30% 'violence' and the movie 'Now You See Me' has 25% 'violence.'

The media guidance application compares the computed third intermediate percentages of each respective media asset to determine a third media asset with a maximum third intermediate percentage. Based on the computed percentage of the presence of 'violence' in each of the movies in the first set of movies and the second set of movies, the media guidance application selects the movie 'Memento' as that movie has the highest percentage of 'violence' among the remaining movies in the first set and the second set.

The media guidance application generates for display a third recommendation of the third media asset instead of the generating for display the first recommendation and the second recommendation. For example, upon determining that the user does not have enough time to watch both 'The Prestige' and 'The Dark Knight' before the 'American Psycho', the media guidance application recommends the movie 'Memento' to the user.

In some embodiments, in response to determining that the user viewed the third media asset, the media guidance application increases the likelihood of the user watching the target media asset to a value greater than the target likelihood, and in response to the increased likelihood, the media guidance application recommends the target media asset to the user. For example, upon determining that the user has watched the movie 'Memento' instead of the movies 'The Prestige', and 'The Dark Knight', the media guidance application may reevaluate and increase the likelihood that the user will watch the 'American Psycho' above the target threshold of 75%. Once the likelihood that the user will watch the 'American Psycho' is past the target threshold of 75%, the media guidance application recommends the 'American Psycho' to the user.

In some embodiments, the media guidance application determines from the user profile, a second user, related to the user. For example, the media guidance application may determine a second user that may be a friend of the first user related to the user via a social network. The second user may have provided the user with access to their viewing history.

The media guidance application may determine whether the second user has viewed the target media asset. For example, using the viewing history provided by the second user to the first user, the media guidance application may determine whether the second user has watched 'American Psycho'.

In response to determining that the second user has viewed the target media asset, the media guidance application determines a third media asset that the second user watched immediately before the target media asset, and recommends the third media asset to the user before the target media asset. For example, once the media guidance application determines that the user has watched 'American Psycho', the media guidance application may determine, from the viewing history of the second user, the media asset the second user consumed just before the 'American Psycho' and recommend that media asset to the user.

In some embodiments, the media guidance application determines whether the first media asset of the first recommendation is part of a subscription service associated with the user. For example, upon recommending the movie 'The Prestige', the media guidance application determines whether 'The Prestige' easily accessible to the user through their video on demand subscription, or as part of their television network service.

In response to determining that the first media asset of the first recommendation is not part of the subscription service, the media guidance application analyzes each media asset part of the subscription service to determine a third media asset similar to the first media asset, and recommend the third media asset to the user. For example, if the media guidance application determines that 'The Prestige is not part of the user's subscription service, the media guidance application may search through the user's subscription service to find movies similar to 'The Prestige.' The search for a similar movie may include finding a match on parameters such as actors, directors, length, genre, a length of various attributes (Thriller, Drama, Violence, Action, Romance) among others.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein to increase a likelihood of media asset consumption using recommendation chains despite a previous preference received from the user stating a dislike for the media attribute (e.g. graphical violence) present in the media asset. For example, the user may register a preference of disliking 'graphical violence' in the past. Based on this preference, the media guidance application may not recommend a movie 'American Psycho' that may be recently made available to the user. In some examples, the media guidance application may infer a user preference of dislike towards violence based on media assets consumed by the user. In order to increase a likelihood of the user to watch 'American Psycho', the media guidance application, may create a recommendation chain, where each consecutive movie in the chain may include a gradual increase of the 'graphical violence' in a movie.

Figure 1:
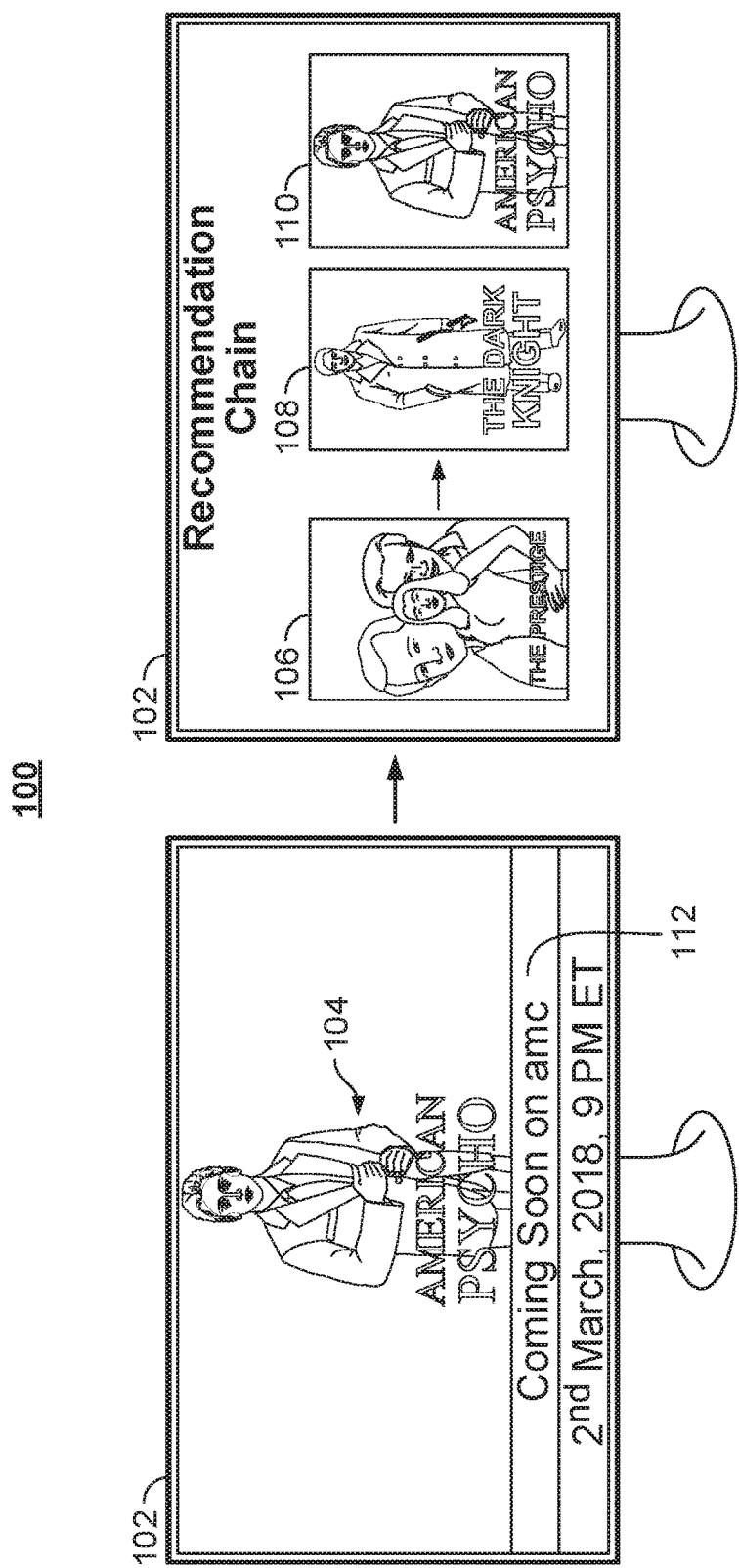
FIG. 1 shows an illustrative example of generating a recommendation chain leading to a target media asset, in accordance with some embodiments of the disclosure.

FIG. 1 shows an illustrative example of generating a recommendation chain leading to a target media asset, in accordance with some embodiments of the disclosure. FIG. 1 contains user device 102 on which an advertisement for a media asset 104 is displayed. In some embodiments, user device 102 may be a television, a phone, a tablet, or any other handheld device. Advertisement 104 displayed on user device 102 depicts a movie 'American Psycho' that will be broadcast at a time in the near future. Ticker 112 displayed on user device 102 along with advertisement 104 shows that the movie will be broadcast on the 'amc' channel on 2 Mar. 2018, at 9 PM Eastern. In some embodiments, the movie may be made available on a video on demand service for a fixed amount of time instead of being broadcast on a television channel. For example, the movie 'American Psycho' may be made available on a service like Netflix or Amazon Prime Video for a period of one week.

The media guidance application may determine from a profile of the user associated with the user device 102 that the user is not interested in the movie 'American Psycho', because of the 'violent' elements of the movie.

The media guidance application may wish to prime the user to watch 'American Psycho' by slowly increasing their exposure to 'violence' in media assets through a chain of media asset recommendations. In some embodiments, the media guidance application may recommend any content in the form of television programs, videos, movies, that may increase the user's exposure to a particular attribute that the user dislike's (e.g., violence). In FIG. 1, the media guidance application creates a chain of recommendations of media assets leading up to 'American Psycho' 110. The recommendation starts with 'The Prestige' 106, followed by 'The Dark Knight' 108. When the user watches the media assets in the order recommended by the media guidance application, the likelihood that the user may watch 'American Psycho' 110 has increased and the user may make an informed decision about watching the movie.

In order to generate useful recommendations 106 and 108, the media guidance application first determines the likelihood of the user watching the target media asset. For example, the media guidance application may determine the likelihood of the user watching 'American Psycho' 110 after the media guidance application determines that 'American Psycho' will be made available to the user from advertisement 104. In such examples, the calculation of the likelihood may be based on a profile associated with the user that may include a viewing history, preferences, and other attributes associated with the user. In such examples, the media guidance application may determine from the user viewing history available that the user has always disliked media assets with 'violent' elements in them. In some embodiments, the media guidance application may determine that the 'violent' attributes may not constitute more than a certain predetermined threshold of the media. For example, the user may like to watch the movie 'Pirates of the Caribbean' which only has 10 minutes of 'violent' scenes compared to 'American Psycho' 110 which has 45 minutes of 'violent' scenes.

In order to determine the likelihood that the user watches a media asset, the media guidance application starts with determining a set of media attributes present in the target media asset. For example, the media guidance application may use metadata associated with each scene of the movie 'American Psycho' to determine dominating traits of each scene in the movie. In some embodiments, the metadata associated with the movie, may divide the movie into a collection of various scenes. Each scene in the movie may be classified in various ways, like 'Drama', 'Action', 'Adventure', 'Romantic', 'Classic', 'Violence'. The classification of the scenes may be based on the dialogues, images, and context of the scene in the movie, among other things. The traits that occur most often in the movie, may be used to define the movie as a whole. Thus, in this example, the movie 'American Psycho' may be classified as 'Classic', 'Drama', 'Violence', etc.

After determining defining attributes of a media asset (American Psycho), the media guidance application determines whether these attributes match the user profile associated with the user. The media guidance application may identify a media attribute from the set of media attributes present in the target media asset that does not match the user profile. For example, the media guidance application may analyze the user profile and compare the attributes associated with the movie 'American Psycho' to the attributes associated with the user profile. The preferences of the user may be recorded based on the media assets consumed by the user. The preferences may also be inferred from media assets that the user has 'liked' or 'disliked'. In this example, the media guidance application may determine that the attribute 'violence' of 'American Psycho' is not associated with the user profile. In such examples, the user may have expressed an explicit dislike towards 'violence' and therefore the media guidance application may not recommend 'American Psycho' to the user. In some examples, 'violence' may be the only attribute of the movie that is not part of the user profile.

In some embodiments, the preference of the user may be recorded based on inputs received from the user regarding a different media asset. The media guidance application determines from a previously received indication from the user, that the user is not interested in a third media asset. For example, while the user has not seen 'American Psycho' previously, the user may have seen a different movie like 'Silence of the Lambs' and disliked it. The preference may be recorded in the media guidance application.

The media guidance application determines a plurality of attributes in the third media asset and compares the plurality of attributes in the third media asset to the media attribute to determine whether the media attribute is part of the third media asset. For example, the media guidance application determines that the movie 'Silence of the Lambs' has many attributes like 'drama', 'classic', violence' etc. associated with the metadata of the movie. In this example, the media guidance application may determine that the attribute of 'violence' in the movie the 'Silence of the Lambs is a dominating attribute and therefore may designate 'Silence of the Lambs' to be a 'violent' movie, based on the metadata associated with the movie.

The media guidance application, identifies that the media attribute matches between the target media asset and the third media asset based on the comparison. For example, given that the media guidance application has determined that the movie 'Silence of the Lambs' is 'violent', the media guidance application determines that the media attribute of 'violence' matches between the 'American Psycho' and 'Silence of the Lambs.'

In some embodiments, in response to determining that the media attribute is part of the third media asset, the media guidance application determines that the media attribute does not match the user profile in a positive way. For example, once the media guidance application determines that the 'Silence of the Lambs' is a 'violent' movie, disliked by the user, the media guidance application records that the attribute of 'violence' does not match the user profile in a positive way.

In some embodiments, the media guidance application may receive a preference from the users over a plurality of media assets based on which, the media guidance application may determine which attributes of media assets are preferred by the user and which are not preferred. Based on the preferences received directly from the user, and automatically inferred based on a watching history of the user, the media guidance application calculate a likelihood that the user may watch a particular media asset. In some embodiments, upon determining the different attributes present in the a media asset ('Silence of the Lambs') the media guidance application may compare the various attributes of the media asset to attributes indicated as preferable in the user profile. The likelihood of the user watching the media asset ('Silence of the Lambs') may be calculated based on the number of attributes that match the between the movie and the preferable attributes of the user profile. In some embodiments, media guidance application may also factor in the amount of each attribute in a movie to calculate the weighted presence of each attribute in the media asset before comparing the attribute to the user profile. For example, the movie 'Silence of the Lambs' may have only 3 attributes 'classic', 'violence', and 'drama'. The movie may be composed of 20% 'classic' elements, 10% 'drama' elements', and 70% 'violence' elements. The user profile may indicate that the user prefers 'classic' and 'drama' but does not prefer 'violence'. In this embodiment, despite two of the three attributes of the media asset being of a user preference, the media guidance application may determine that the user will not wish to view this media asset because of the amount of 'violence' in the media asset.

Once the media guidance application determines that the user does not prefer the target media asset ('American Psycho') because of a specific attribute, the media guidance application determines what percentage of the movie constitutes the specific target attribute. This is done so that the media guidance application may calculate the right media asset recommendations that will prime the user to watch the target media asset (American Psycho). For example, if the target media asset is 40% 'violent', and the maximum violence the user can tolerate in a media asset preferred by the user is 7%, the media guidance application has to search for target media assets that will slowly increase the 'violent' component from 7% to 40%. The media guidance application need to expose the user to a 90% 'violent' movie. A move like that may backfire given the user's predisposition to avoid violence.

In order to determine what portion of a media asset constitutes a particular media attribute, the media guidance application determines a first length of the target media asset, determines a second length of a portion of the target media asset in which the media attribute is present, and computes a ratio of the first length of to the second length to determine a percentage of the media attribute present in the target media asset. For example, the media guidance application may determine a first length of the movie 'American Psycho' and a second length of the 'violent' attribute present in the movie. The media guidance application may determine the second length of the 'violent' attribute by determining a collective length of the scenes associated with the 'violence' attribute. In this example, the media guidance application may determine a ratio of the length of the 'violent' part of the film to the length of the film, to determine a percentage of the movie that is considered 'violent.' In this example, 'American Psycho' may be determined to have scenes of 'violence' that have a total length 45 minutes of a one hour 45-minute movie. Therefore, the media guidance application may determine that 43% of 'American Psycho' is 'violent.'

In some embodiments, the media guidance application determines the second length of the portion of the target media asset in which the media attribute is present by identifying metadata describing attributes of a plurality of scenes of the target media asset. Each scene in the media asset may have metadata associated with it. The metadata associated with each scene may indicate attributes highlighted in the scene. For example, the metadata associated with scenes in the movie may include identifiers of the scene like 'action', 'romance', 'violence', 'drama' etc. In some embodiments, the metadata may be programmed in the movie by the movie provider. In some embodiments, the media guidance application may use metadata elements like subtitles, closed caption, video analysis, to divide the target media asset into various scenes and based on the metadata, also assign attributes to each scene for classification.

From the metadata, the media guidance application determines a subset of scenes from the plurality of scenes with metadata that include the media attribute. For example, the media guidance application may determine a subset of scenes of the movie 'American Psycho' that are all associated with the media attribute 'violence'.

The media guidance application determines a length of each scene of the subset of scenes and adds the determined lengths of each scene of the subset of scenes to calculate the second length of the target media asset. For example, the media guidance application may determine the length of each scene in the subset of scenes of 'American Psycho' that are associated with the label of 'violence' and add the length of each of the scenes to determine a length of the 'violent' portion of the movie. In this example, the media guidance application may determine that the 'American Psycho' has 45 minutes of violence.

In some embodiments, the user may determine that a likelihood that the user will watch 'American Psycho' is 25% based on the quantity of 'violence' in the movie and the preferences received by the user among other factors.

In some embodiments, the media guidance application starts preparing the user to watch 'American Psycho' 110 by generating a list of movies the user should watch before the media guidance application believes that the user is ready to watch 'American Psycho' 110.

The media guidance application begins by determining a first set of media assets with a likelihood of the user watching each media asset in the first set of media assets that is above the target threshold. For example, the media guidance application may only recommend media assets to the user if the media guidance application determines that the likelihood of the user watching the media asset is above the target likelihood value. The target likelihood value may be a numerical value (e.g., 75%). In some embodiments, the target threshold value may be determined by the user. The user may only wish to have media assets recommended that have a likelihood score of at least 75% that the user will watch the media asset.

In this example, the media guidance application may start the process of manufacturing recommendation chains for the user by determining a first set of media assets, where each media asset has a likelihood of the user watching the media asset that is higher than the target likelihood.

The first set of media assets may include movies, television programs, podcasts, videos among other programs that have a likelihood higher than the target likelihood of the user watching the first set of media assets. In some embodiments, these media assets may include a collection of movies, television programs, videos that are accessible to the user. The media assets may be associated with attributes that the user has shown a preference for in the past. Even if some of the media assets may have 'violence', the quantity of the 'violence' may be low enough that it is not a dominating characteristic of the media asset.

From the first set of media assets, the media guidance application may determine a first media asset of the recommendation chain to be recommended to the user. The media guidance application analyses each media asset within the first set of media assets to determine a ratio of a length each media asset with the media attribute to the length of the each media asset to compute a first intermediate percentage of media attribute present in the each media asset. For example, the media guidance application may determine a level of 'violence' in each media asset of the first set of media assets. As the media guidance application does not prefer the 'violence' attributes, all of the media assets in the first set of media assets may have little or no violence in them. Some media assets recommended in this example may be 'Toy Story', 'The Prestige', 'Cast Away', 'You Have Got Mail', and 'Forrest Gump'. In this example, the media guidance application may recommend media assets that may or may not be related to the target media asset 'American Psycho.' In some examples, the media guidance application may pick the most popular movie to recommend to the user, that may have the highest likelihood to be watched by the user.

In the first set of media assets with little or no violence, the media guidance application may select the media asset with the highest level of 'violence'. The media guidance application compares the computed first intermediate percentages of each media asset to determine a first media asset with a maximum first intermediate percentage of the media attribute less than the percentage by a first threshold. For example, the media guidance application may determine that the movie 'You Have Got Mail' has no violence (0%), the movie 'Toy Story' is an animated movie with 2% 'violence', the movie 'Forrest Gump' has 4% 'violent', the movie 'Cast Away' has 5% 'violence', and the movie 'The Prestige' has 7% 'violence.' In such examples, the media guidance application may select the movie 'The Prestige' to recommend to the user.

The media guidance application may generate for display a first recommendation of the first media asset. The recommendation of 'The Prestige' is shown in FIG. 1 at 106. For example, the media guidance application may recommend the 'The Prestige' to the user as the next media asset. The recommendation may be provided as an alert to user device 102 associated with the user.

In some embodiments, the media guidance application determines whether the first media asset of the first recommendation is part of a subscription service associated with the user. For example, upon recommending the movie 'The Prestige' 106, the media guidance application determines whether 'The Prestige' easily accessible to the user through their video on demand subscription, or as part of their television network service.

In response to determining that the first media asset of the first recommendation is not part of the subscription service, the media guidance application analyzes each media asset part of the subscription service to determine a third media asset similar to the first media asset, and recommending the third media asset to the user. For example, if the media guidance application may determine that 'The Prestige is not part of the user's subscription service, the media guidance application may search through the user's subscription service to find movies similar to 'The Prestige' 106. The search for a similar movie may include finding a match on parameters such as actors, directors, length, genre, a length of various attributes (Thriller, Drama, Violence, Action, Romance) among others. In some embodiments, the media guidance application may select a different movie by the same director Christopher Nolan, like 'Interstellar', or 'Inception', that has approximately the same amount of 'violence' as 'The Prestige' 106. In some embodiments, the media guidance application may select a movie by an entirely different director and cast, but with approximately the same level of 'violence' in the film, like 'Pirates of Caribbean.'

In some embodiments, the media guidance application determines from the user profile, a second user, related to the user. For example, the media guidance application may determine a second user that may be a friend of the first user related to the user via a social network. The second user may have provided the user with access to their viewing history. In some embodiments, the second user may share user device 102 with the user as they may be living in the same apartment. In some embodiments, the second user and the first user may be related to each other.

From the accessible viewing history of the second user, the media guidance application may determine whether the second user has viewed the target media asset. For example, using the viewing history provided by the second user to the first user, the media guidance application may determine whether the second user has watched 'American Psycho.' In some embodiments, the media guidance application may also determine a similarity between the first user and the second user. For example, the second user may also not have had a positive preference related to violence that may have increased right before the second user watched 'American Psycho' 110. In such an example, it may be beneficial to expose the user to the same media asset that the second user consumed before 'American Psycho' 110. This might give the user some confidence in the recommendation to watch the selected media assets despite not being in favor of watching 'violence'.

In response to determining that the second user has viewed the target media asset, the media guidance application determines a third media asset that the second user watched immediately before the target media asset, and recommends the third media asset to the user before the target media asset. For example, once the media guidance application determines that the user has watched 'American Psycho', the media guidance application may determine, from the viewing history of the second user, the media asset the second user consumed just before the 'American Psycho' 110 and recommend that media asset to the user.

The media guidance application, in response to determining that the user has consumed the first media asset, increases the likelihood of the user watching the target media asset to an intermediate value greater than the determined likelihood and less than the target likelihood. For example, the media guidance application, upon determining that the user has watched 'The Prestige' 106, may increase the likelihood that the user will watch 'American Psycho' from the previously computed 25% to 50%. In some embodiments, the increase in likelihood may be based on whether the user likes' or dislikes' the movie. In some embodiments, if the user watches 'The Prestige' 106, but dislikes it, the likelihood that the user will like the 'American Psycho' 110 may increase from 25% but only a small amount to 35% for example. In case the user likes 'The Prestige' 106 after watching it, the likelihood of watching 'American Psycho' 110 may increase to 50%. In some embodiments, despite the fact that the media guidance application recommends 'The Prestige' 106, the user may consume a different media asset. The media guidance application may continue to recalculate a likelihood of watching 'American Psycho' based on the different media asset consumed by the user. The calculation may include, the amount of 'violence' in the different asset, the length of the asset, and whether the user expressed an explicit preference for the asset.

Now, based on the fact that the user has consumed the 'The Prestige', the media guidance application may begin to determine a second set of media movies that are related to the first movie. The media guidance application may determine a second set of media assets related to the first media asset. For example, the media guidance application may recommend movies such as The Dark Knight, Memento, Now You See Me. The relation between the first movie and the second set of movies may be based on a similarity in actors, director, genre, theme, among others.

In some embodiments, each movie in the second set of movies, will have a 'violent' percentage that may be higher than the first media asset. In some embodiments, while the 'violent' component of each movie in the second movie may be higher than the first media asset, the 'violent' percentage, may not be higher than the target media asset. In some embodiments, some media assets recommended in the second set of media assets, may be recommended because of the user's increased exposure to 'violence' based on the user consuming 'The Prestige' 106. In some embodiments, the likelihood of the user watching each media asset in the second set of media assets may be above the target likelihood (e.g., 75%).

The media guidance application may analyze each media asset within the second set of media assets to determine a ratio of a length each media asset with the media attribute to the length of the each media asset to compute a second intermediate percentage of media attribute present in the each media asset, wherein the second intermediate percentage is greater than the maximum first intermediate percentage. For example, as with the second set of media assets, the media guidance application may determine may select the media asset with the highest level of 'violence' from the second set of media assets. From the determined ratios, the media guidance application may compare the computed second intermediate percentages of each media asset to determine a second media asset with a maximum second intermediate percentage.

For example, the media guidance application may determine that the movie 'Memento' is a movie with 30% 'violence', the movie 'The Dark Knight' has 40% violence, and the movie 'Now You See Me' has 25% 'violence.' In such examples, the media guidance application may select the movie 'The Dark Knight' to recommend to the user.

The media guidance application may generate for display a second recommendation of the second media asset. For example, the media guidance application may recommend the 'The Dark Knight' 108 to the user as the next media asset. The recommendation may be provided as an alert to user device 102 associated with the user.

Upon determining that the user has consumed the 'The Dark Knight' movie 108, the media guidance application may now determine that the user is ready to watch 'American Psycho' 110. The media guidance application in response to determining that the user consumes the second media asset, increases the likelihood of the user watching the target media asset to a value greater than the target likelihood, and in response to the increased likelihood, recommending the target media asset to the user. For example, the media guidance application may increase the likelihood that the user will watch 'American Psycho' from 50% to 77%. Based on this increase, the media guidance application may recommend the movie 'American Psycho' to the user for consumption. In some embodiments, the increase in likelihood may be based on whether the user 'likes' or 'dislikes' the movie. In some embodiments, if the user watches 'The Dark Knight' 108, but dislikes it, the likelihood that the user will like the 'American Psycho' 110 may increase from 50% but only a small amount to 55% for example. In case the user likes 'The Dark Knight' 108 after watching it, the likelihood of watching 'American Psycho' 110 may increase to 77%. In some embodiments, despite the fact that the media guidance application recommends 'The Dark Knight' 108, the user may consume a different media asset. The media guidance application may continue to recalculate a likelihood of watching 'American Psycho' based on the different media asset consumed by the user. The calculation may include, the amount of 'violence' in the different asset, the length of the asset, and whether the user expressed an explicit preference for the asset.

In some embodiments, the media guidance application increases the likelihood of the user watching the target media asset. The media guidance application determines that the user has viewed the first media asset and the second media asset. For example, the media guidance application may keep of track of whether the user has watched the recommended first media asset 'The Prestige' 106 and the second media asset, the 'The Dark Knight' 108 movies.

In response to determining that the user has viewed the first media asset and the second media asset, the media guidance application revaluates a second likelihood that the user is interested in the third media asset. For example, based on the fact that the user has watched 'The Prestige' 106 and the 'The Dark Knight' 108, the media guidance application is now required to recalculate the likelihood that the user will watch the 'American Psycho' 110.

The media guidance application determines that the second likelihood is above the target threshold, and in response to determining that the second likelihood is above the target threshold, the media guidance application reverses an indication related to the media attribute in the user profile to state that the media attribute matches the user profile. For example, because the user has not watched and liked movies with violence', like "The Prestige' 106 and 'The Dark Knight' 108, the media guidance application may determine that the likelihood of the user to watch the 'American Psycho' 110 may be above the target threshold of 75%. In case the likelihood is above the threshold, the media guidance application may recommend the 'American Psycho' 110 to the user.

In some embodiments, the media guidance application may determine whether the user is able to consume the first media asset and the second media asset before a target release date of the target media asset, based on a viewing pattern of the user associated with the user profile. For example, the media guidance application may determine that the movie 'American Psycho' 110 is being made available to the user on Mar. 2, 2018 according to the ticker 112 displayed on user device 102. The media guidance application may also determine that the user watches 1 hour of television a day. Therefore, the user may not be able to consume both movies in the given period of time before the 'American Psycho' 110 is made available to the user.

In some embodiments, in response to determining that the user is unable to consume the first media asset and the second media asset before the target release date of the target media asset, the media guidance application analyses each respective media asset within the first set of media assets and the second set of media assets to determine a respective ratio of a combined length of a plurality of scenes with metadata that include the media attribute to the length of each respective media asset. For example, upon determining that the user may not be able to watch 'The Prestige' 106 and 'The Dark Knight' 108 before the 'American Psycho' 110 is available to the user, the media guidance application may search through the first set of media assets and the second set of media assets to determine the ratio of the length of 'violent' scenes in a movie to the length of the movie for each movie in the first set and the second set. In this example, the remainder of the first set and the second set of movies together include movies like "Toy Story', 'Cast Away', 'You Have Got Mail', 'Forrest Gump', 'Memento', and 'Now You See Me.'

The media guidance application may compute a third intermediate percentage of media attribute using the determined respective ratio of each respective media asset, wherein the computed third intermediate percentage is greater than the maximum first intermediate percentage and less than the maximum second intermediate percentage. For example, as described previously, the media guidance application may determine that in the first set of media assets, the movie You Have Got Mail' has no violence (0%), the movie 'Toy Story' is an animated movie with 2% 'violence', the movie 'Forrest Gump' has 4% 'violence', and the movie 'Cast Away' has 5% 'violence.' Additionally, the media guidance application may determine that in the second set of movies, the movie the movie 'Memento' is a movie with 30% 'violence' and the movie 'Now You See Me' has 25% 'violence.'

The media guidance application compares the computed third intermediate percentages of each respective media asset to determine a third media asset with a maximum third intermediate percentage. Based on the computed percentage of the presence of 'violence' in each of the movies in the first set of movies and the second set of movies, the media guidance application selects the movie 'Memento' as that movie has the highest percentage of violence among the remaining movies in the first set and the second set.

The media guidance application generates for display a third recommendation of the third media asset instead of the generating for display the first recommendation and the second recommendation. For example, upon determining that the user does not have enough time to watch both 'The Prestige' 106 and 'The Dark Knight' 108 before the 'American Psycho' 110, the media guidance application recommends the movie 'Memento' to the user.

In some embodiments, in response to determining that the user viewed the third media asset, the media guidance application increases the likelihood of the user watching the target media asset to a value greater than the target likelihood, and in response to the increased likelihood, the media guidance application recommends the target media asset to the user. For example, upon determining that the user has watched the movie 'Memento' instead of the movies 'The Prestige' 106, and 'The Dark Knight' 108, the media guidance application may reevaluate and increase the likelihood that the user will watch the 'American Psycho' above the target threshold of 75%. Once the likelihood that the user will watch the 'American Psycho' is past the target threshold of 75%, the media guidance application recommends the 'American Psycho' 110 to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, web-sites, and any other type of guidance data that is helpful for a user to navigate among and locate desired content selections.

Figure 2:
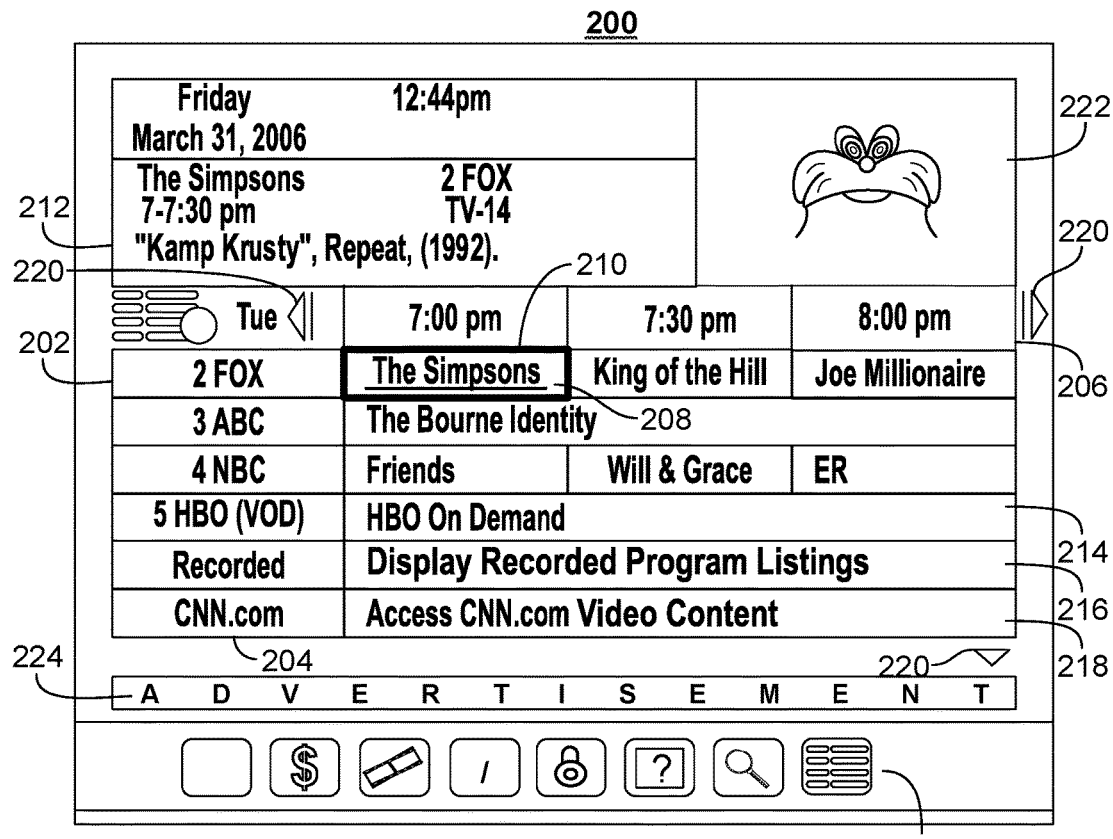
FIG. 2 shows an illustrative embodiment of a display screen that may be used to provide media guidance application listings and other media guidance information, in accordance with some embodiments of the disclosure.
Figure 3:
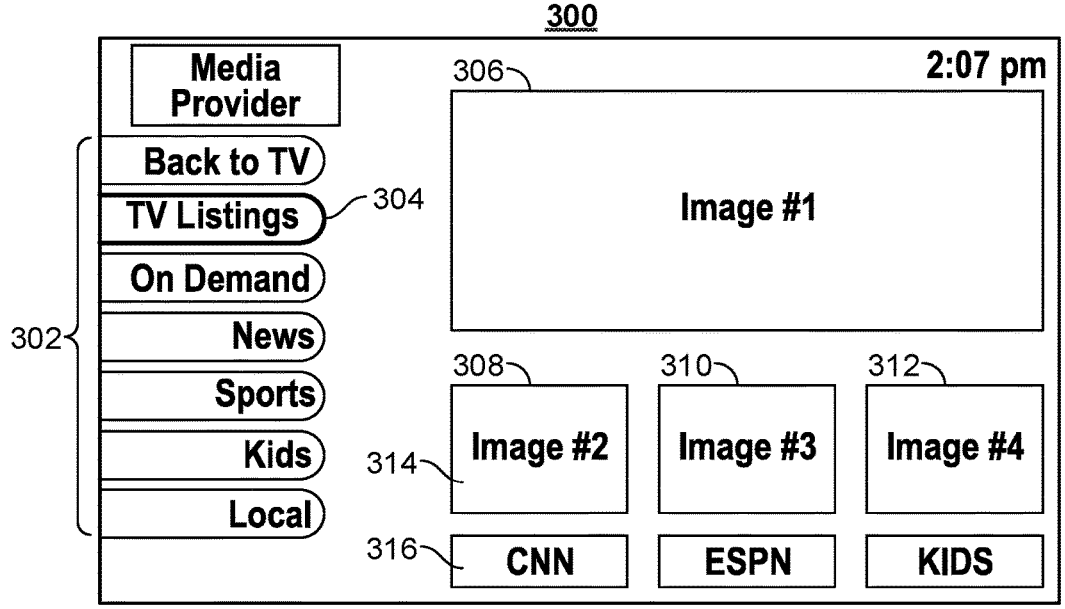
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
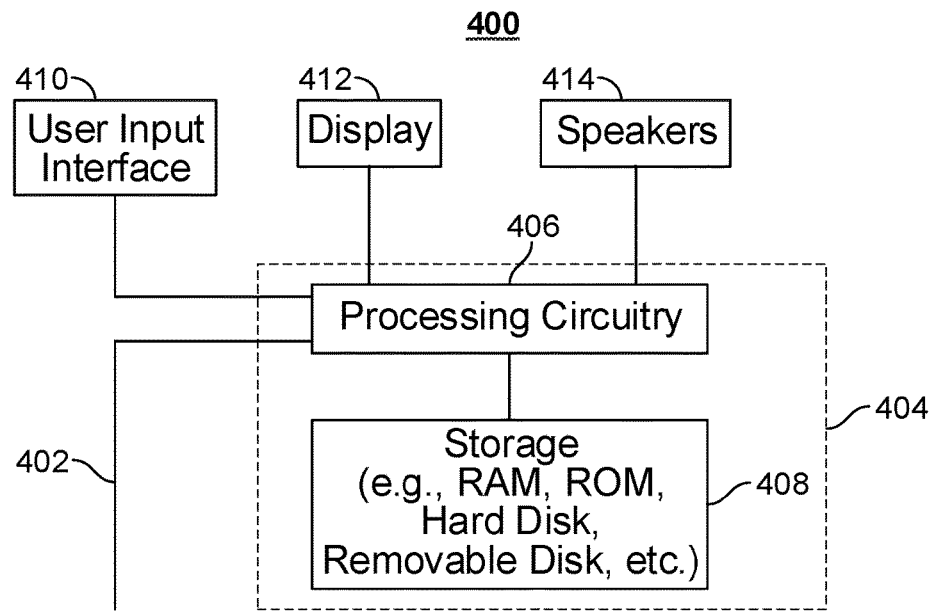
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
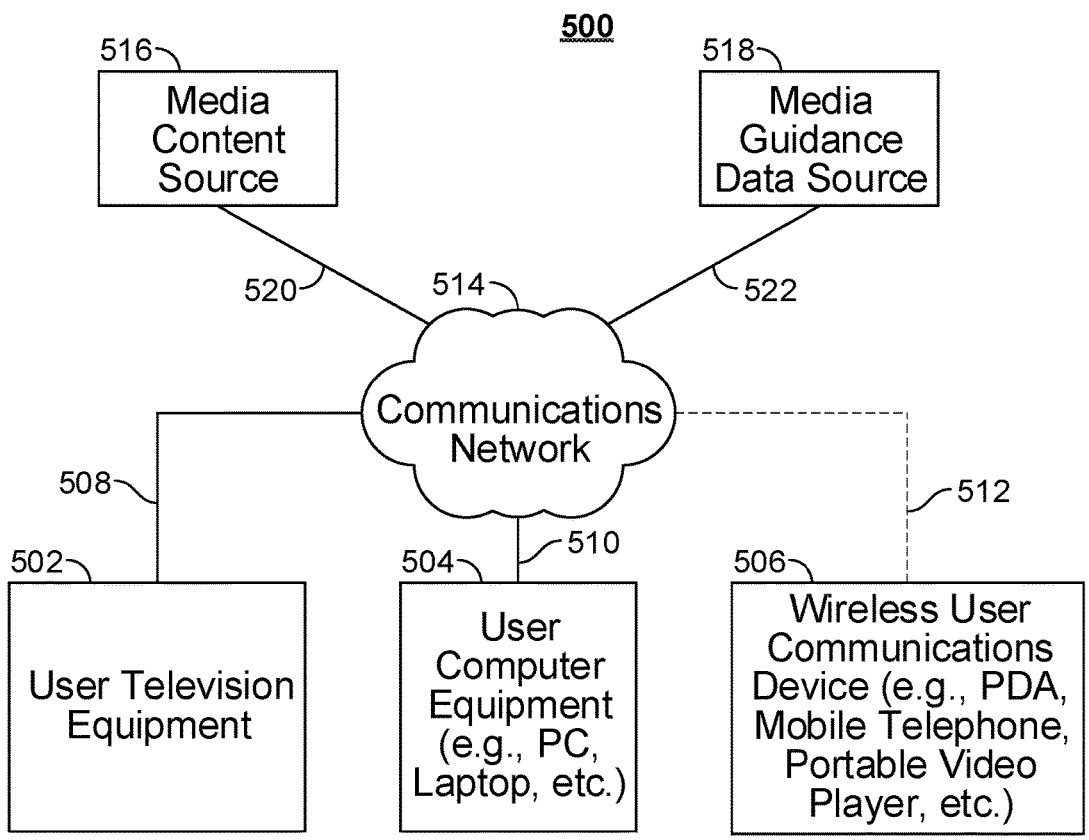
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514.

Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
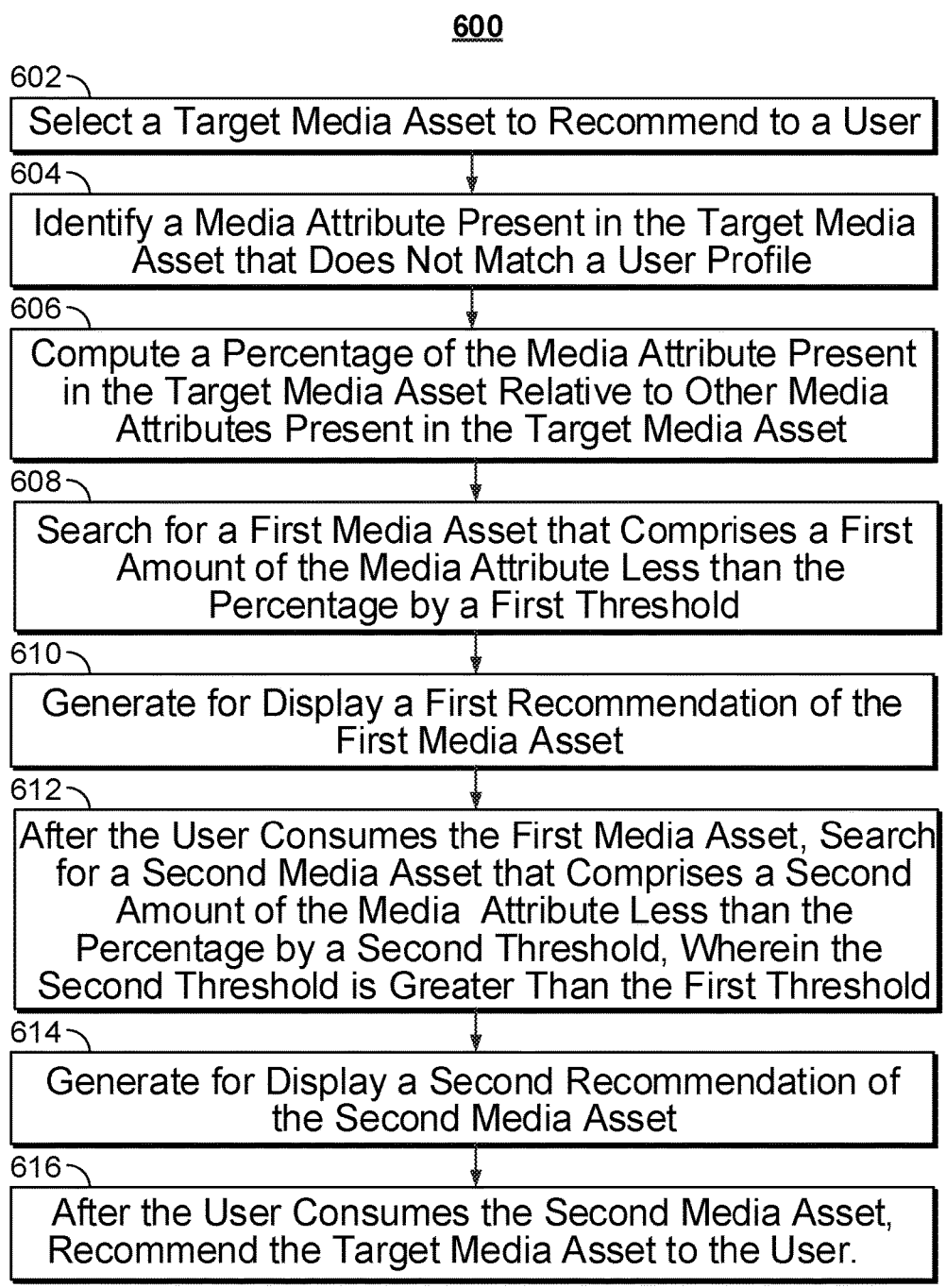
FIG. 6 depicts an illustrative flowchart of a process for generating a recommendation chain leading to a target media asset, in accordance with some embodiments of the disclosure.

FIG. 6 depicts an illustrative flowchart of a process for generating a recommendation chain leading to a target media asset, in accordance with some embodiments of the disclosure. Process 600 may be executed by control circuitry 404 (e.g., in a manner instructed to control circuitry 404 by the media guidance application). In addition, one or more steps of process 600 may be incorporated into or combined with one or more steps of any other process or embodiment (e.g., as described in relation to FIGS. 7-12).

Process 600 begins at 602, where control circuitry 404 selects a target media asset to recommend to a user. For example, control circuitry 404 may select a media asset that is recently made available to the user as a target media asset. Control circuitry 404 may determine from an advertisement 104 of the movie 'American Psycho' 110, that the movie may be made available to the user as part of their subscription service at a video on-demand service. In order to increase the viewership of the movie 'American Psycho' 110, the media guidance application may select 'American Psycho' 110 a target media asset. In some examples, there may be a scheduled television broadcast of the movie 'American Psycho' as shown in ticker 112, for which the user may want to be prepared and may request the media guidance application to come up with a chain of media asset recommendations that may prepare the user for the movie 'American Psycho' 110.

At 604, control circuitry 404 identifies a media attribute present in the target media asset that does not match a user profile. For example, control circuitry 404 may analyze the user profile stored in storage 408 and compare the attributes associated with the movie 'American Psycho' 110. The preferences of the user may be recorded based on the media assets consumed by the user. The preferences may also be inferred from media assets that the user has 'liked' or 'disliked. In this example, the media guidance application may determine that the attribute 'violence' of 'American Psycho' 110 is not associated with the user profile. In such examples, the user may have expressed an explicit dislike towards 'violence' and therefore the media guidance application may not recommend 'American Psycho' to the user. In some examples, 'violence' may be the only attribute of the movie that is not part of the user profile.

At 606, control circuitry 404 computes a percentage of the media attribute present in the target media asset relative to other media attributes present in the target media asset. For example, control circuitry 404 application may determine a subset of scenes of the movie 'American Psycho' 110 that are all associated with the media attribute 'violence'. Control circuitry 404 may determine the length of each scene in the subset of scenes of 'American Psycho' that are associated with the label of 'violence' and add the length of each of the scenes to determine a length of the 'violent' portion of the movie. In this example, control circuitry 404 may determine that the 'American Psycho' has 45 minutes of violence out of a total runtime of 1 hour and 45 minutes (43%).

At 608, control circuitry 404 searches for a first media asset that comprises a first amount of the media attribute less than the percentage by a first threshold. For example, control circuitry 404 may determine that movies that the user is likely to watch, for example, 'The Prestige' 106 has 7% violence, which is less than the level of 'violence' in 'American Psycho' by a first threshold of 36%.

At 610, control circuitry 404 generates for display a first recommendation of the first media asset. The recommendation of 'The Prestige' is shown in FIG. 1 at 106. For example, control circuitry 404 may recommend the 'The Prestige' to the user as the next media asset. The recommendation may be provided as an alert to user device 102 associated with the user.

At 612, after the user consumes the first media asset, control circuitry 404 searches for a second media asset that comprises a second amount of the media attribute less than the percentage by a second threshold, wherein the second threshold is greater than the first threshold. For example, control circuitry 404 may determine that the movie 'The Dark Knight' has 40% 'violence' that is greater than the 7% violence in 'The Prestige'. In such examples, control circuitry 404 may select the movie 'The Dark Knight' to recommend to the user.

At 614, control circuitry 404 generates for display a second recommendation of the second media asset. For example, control circuitry 404 may recommend the 'The Dark Knight' 108 to the user as the next media asset. The recommendation may be provided as an alert to user device 102 associated with the user.

At 616, after the user consumes the second media asset, control circuitry 404 recommends the target media asset to the user. Upon determining that the user has consumed the 'The Dark Knight' movie 108, control circuitry 404 may now determine that the user is ready to watch 'American Psycho' 110.

Figure 7:
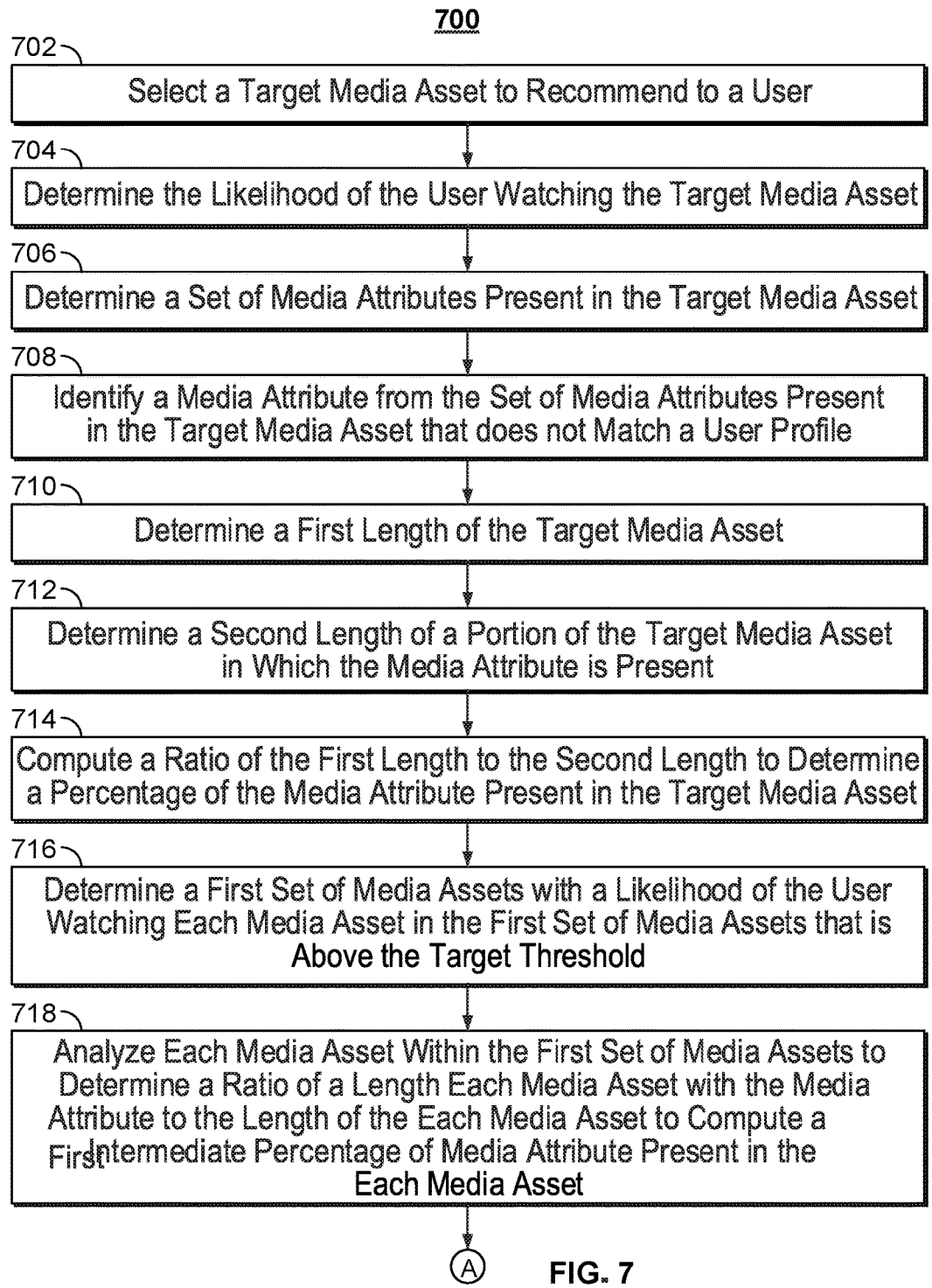
FIG. 7 depicts an illustrative flowchart of a process for generating a recommendation chain leading to a target media asset, in accordance with some embodiments of the disclosure.
Figure 7:
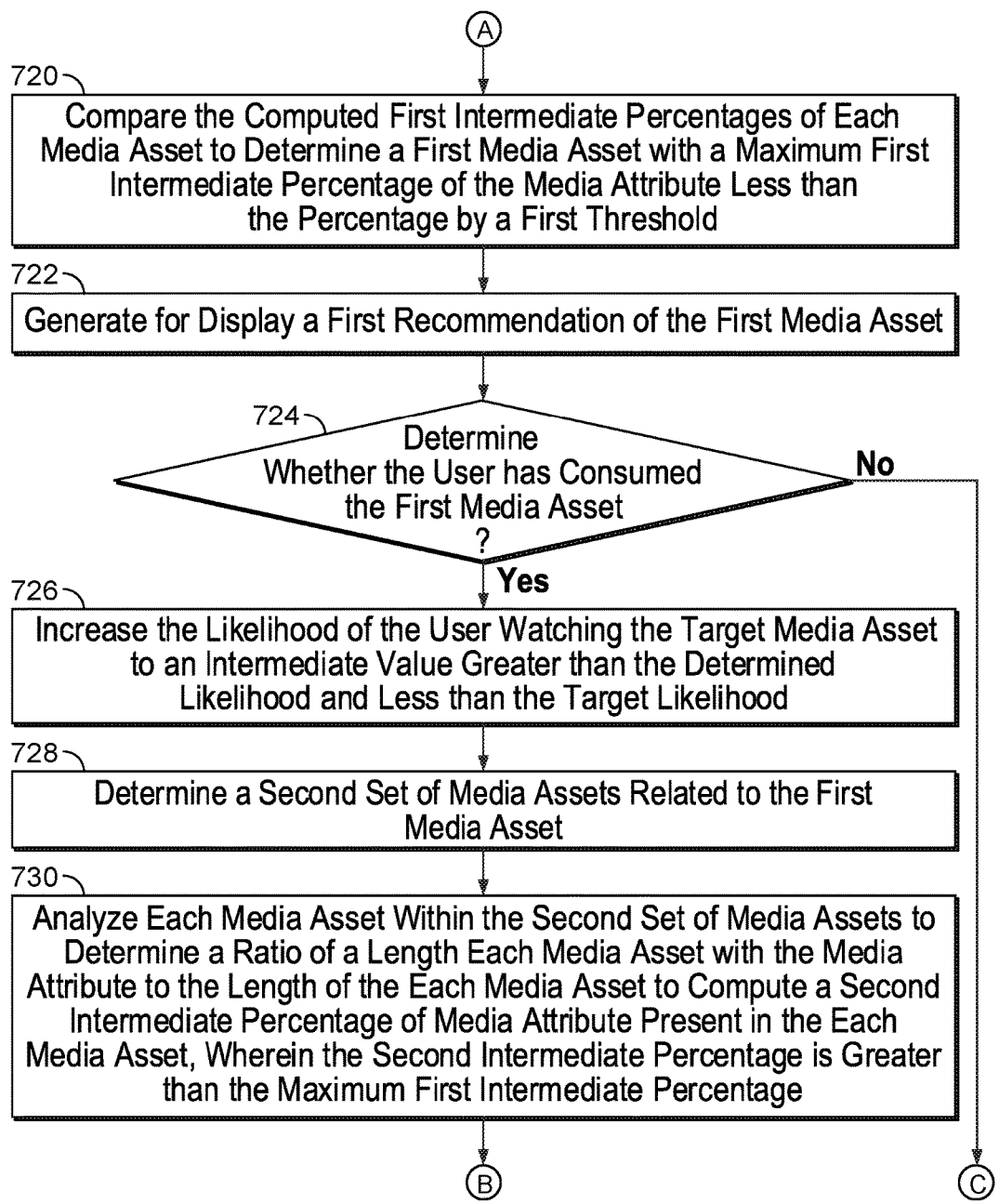
Figure 7:
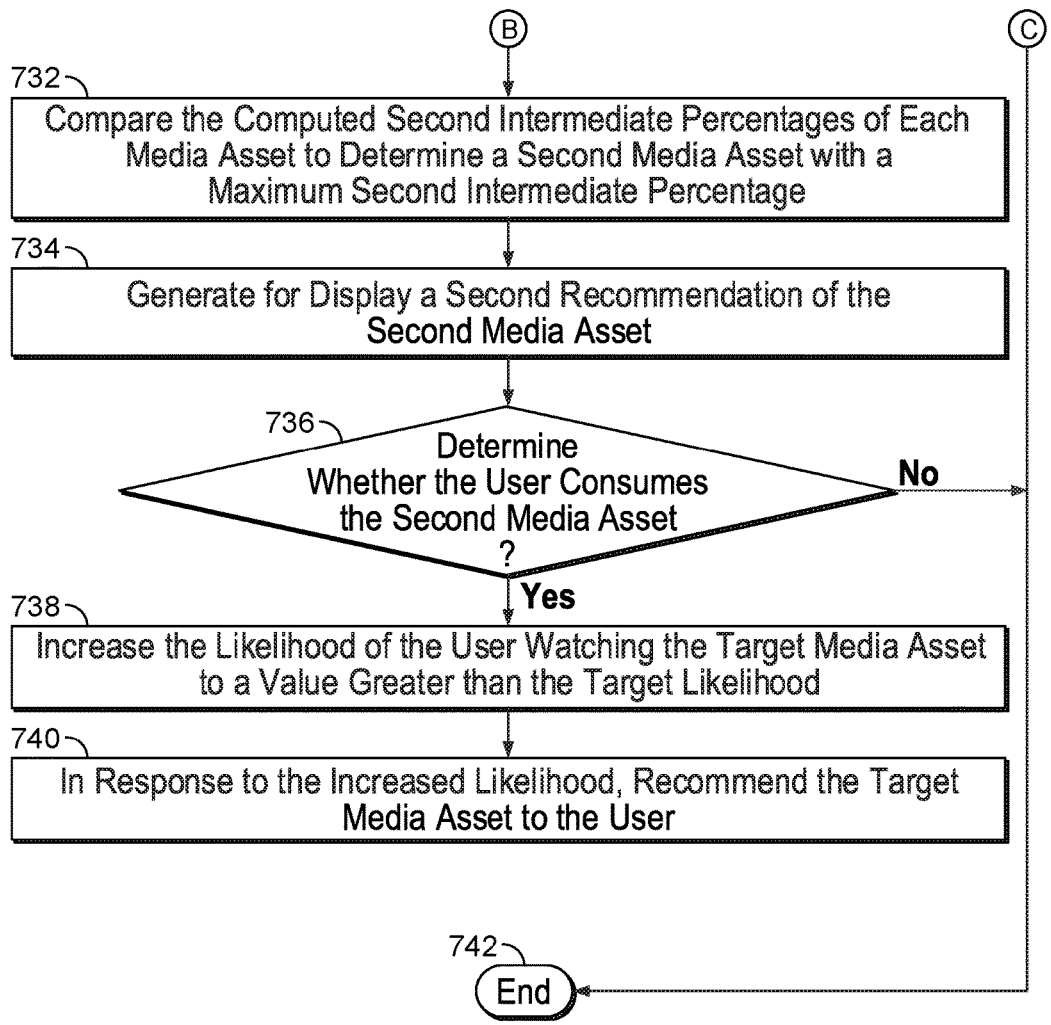

FIG. 7 depicts an illustrative flowchart of a process for generating a recommendation chain leading to a target media asset, in accordance with some embodiments of the disclosure. Process 700 may be executed by control circuitry 404 (e.g., in a manner instructed to control circuitry 404 by the media guidance application). In addition, one or more steps of process 700 may be incorporated into or combined with one or more steps of any other process or embodiment (e.g., as described in relation to FIGS. 6 and 8-12).

Process 700 begins at 702, where control circuitry 404 selects a target media asset to recommend to a user. For example, control circuitry 404 may select a media asset that is recently made available to the user as a target media asset. Control circuitry 404 may determine from an advertisement 104 of the movie 'American Psycho' 110, that the movie may be made available to the user as part of their subscription service at a video on-demand service. In order to increase the viewership of the movie 'American Psycho' 110, control circuitry 404 may select 'American Psycho' 110 as a target media asset. In some examples, there may be a scheduled television broadcast of the movie 'American Psycho' as shown in ticker 112, for which the user may want to be prepared and may request control circuitry 404 to come up with a chain of media asset recommendations that may prepare the user for the movie 'American Psycho' 110.

At 704, control circuitry 404 determines the likelihood of the user watching the target media asset. For example, control circuitry 404 may determine the likelihood of the user watching 'American Psycho' 110. In such examples, the calculation of the likelihood may be based on a profile associated with the user that may include a viewing history, preferences, and other attributes associated with the user. In some examples, the user may determine that a likelihood that the user will watch 'American Psycho' 110 is 25%.

At 706, control circuitry 708 determines a set of media attributes present in the target media asset. For example, control circuitry 404 may use metadata associated with each scene of the movie 'American Psycho' 110 to determine dominating traits of each scene in the movie. Each scene in the movie may be classified in various ways, like 'Drama', 'Action', 'Adventure', 'Romantic', 'Classic', 'Violence'. The traits that occur most often in the movie, may be used to define the movie as a whole. Thus, in this example, the movie 'American Psycho' may be classified as 'Classic', 'Drama', 'Violence', etc.

At 708, control circuitry identifies a media attribute from the set of media attributes present in the target media asset that does not match a user profile. For example, control circuitry 404 may analyze the user profile and compare the attributes associated with the movie 'American Psycho'. The preferences of the user may be recorded based on the media assets consumed by the user. The preferences may also be inferred from other media assets that the user has previously 'liked' or 'disliked. In this example, control circuitry 404 may determine that the attribute 'violence' of 'American Psycho' 110 is not associated with the user profile. In such examples, the user may have expressed an explicit dislike towards 'violence' and therefore control circuitry 404 may not recommend 'American Psycho' to the user. In some examples, 'violence' may be the only attribute of the movie that is not part of the user profile.

At 710, control circuitry 404 determines a first length of the target media asset. For example, control circuitry 404 may determine a first length of the movie 'American Psycho' 110. In some embodiments, control circuitry 404 may determine a length of the movie 'American Psycho' to be 1 hour and 45 minutes.

At 712, control circuitry 404 determines a second length of a portion of the target media asset in which the media attribute is present. For example, control circuitry 404 may determine a second length of the violent attribute present in the movie. Control circuitry 404 may determine the second length of the violent attribute by determining a collective length of the scenes associated with the 'violence' attribute. In this example, control circuitry 404 may determine a ratio of the length of the 'violent' part of the film to the length of the film, to determine a percentage of the movie that is considered 'violent.' In this example, 'American Psycho' 110 may be determined to have scenes of 'violence' that have a total length 45 minutes of a one hour 45-minute movie.

At 714, control circuitry 404 computes a ratio of the first length to the second length to determine a percentage of the media attribute present in the target media asset. Therefore, control circuitry 404 may determine that 43% of 'American Psycho' is 'violent' using the total length of the movie and the length of the movie that is determined to be 'violent' previously.

At 716, control circuitry 404 determines a first set of media assets with a likelihood of the user watching each media asset in the first set of media assets that is above the target threshold. For example, control circuitry 404 may only recommend media assets to the user if control circuitry 404 determines that the likelihood of the user watching the media asset is above the target likelihood value. The target likelihood value may be a numerical value (e.g., 70%, 75%). In this example, control circuitry 404 may start the process of manufacturing recommendation chains for the user by determining a first set of media assets, where each media asset has a likelihood of the user watching the media asset that is higher than the target likelihood.

At 718, control circuitry 404 analyzes each media asset within the first set of media assets to determine a ratio of a length each media asset with the media attribute to the length of the each media asset to compute a first intermediate percentage of media attribute present in the each media asset. For example, control circuitry 404 may determine a level of 'violence' in each media asset of the first set of media assets. As control circuitry 404 does not prefer the 'violence' attributes, all of the media assets in the first set of media assets may have little or no violence in them. Some media assets recommended in this example may be 'Toy Story', 'The Prestige', 'Cast Away', 'You Have Got Mail', and 'Forrest Gump'. Using the ratio of the length of 'violence' in the movie to the length of the movie as described above, control circuitry 404 may determine that the movie 'You Have Got Mail' has no violence (0%), the movie 'Toy Story' is an animated movie with 2% 'violence', the movie 'Forrest Gump' has 4% 'violent', the movie 'Cast Away' has 5% 'violence', and the movie 'The Prestige' has 7% 'violence.'

At 720, control circuitry 404 compares the computed first intermediate percentages of each media asset to determine a first media asset with a maximum first intermediate percentage of the media attribute less than the percentage by a first threshold. For example, based on the computed percentages of 'violence' in each media asset in the first set of media assets, control circuitry 404 may select the movie 'The Prestige' 106 to recommend to the user.

At 722, control circuitry 404 generates for display a first recommendation of the first media asset. For example, control circuitry 404 may recommend the 'The Prestige' 106 to the user as the next media asset. The recommendation may be provided as an alert to the user device 102 associated with the user.

At decision block 724, control circuitry 404 determines whether the user has consumed the first media asset. Upon determining that the user has consumed the first media asset 'The Prestige' 106, control circuitry 404 moves process 700 to 726 to increase the likelihood of the user watching the target media asset to an intermediate value greater than the determined likelihood and less than the target likelihood. In case control circuitry 404 determines that the user has not consumed the first media asset 'The Prestige' 106, control circuitry 404 moves process 700 to 742 to end the process.

At 726, control circuitry 404 increases the likelihood of the user watching the target media asset to an intermediate value greater than the determined likelihood and less than the target likelihood. For example, control circuitry 404, upon determining that the user has watched 'The Prestige', may increase the likelihood that the user will watch 'American Psycho' from the previously computed 25% to 50%.

At 728, control circuitry 404 determines a second set of media assets related to the first media asset. For example, control circuitry 404 may recommend movies such as The Dark Knight, Memento, Now You See Me. The relation between the first movie and the second set of movies may be based on a similarity in actors, director, genre, theme, among others.

At 730, control circuitry 404 analyzes each media asset within the second set of media assets to determine a ratio of a length each media asset with the media attribute to the length of the each media asset to compute a second intermediate percentage of media attribute present in the each media asset, wherein the second intermediate percentage is greater than the maximum first intermediate percentage. For example, as with the first set of media assets, control circuitry 404 may determine, using the ratios of the length of the attribute in the media asset to the length of the media asset, the media asset with the highest level of 'violence' from the second set of media assets. From the determined ratios, control circuitry 404 may compare the computed second intermediate percentages of each media asset to determine a second media asset with a maximum second intermediate percentage.

At 732, control circuitry 404 compares the computed second intermediate percentages of each media asset to determine a second media asset with a maximum second intermediate percentage. For example, control circuitry 404 may determine that the movie the movie 'Memento' is a movie with 30% 'violence', the movie 'The Dark Knight' has 40% violence, and the movie 'Now You See Me' has 25% 'violence.' based on the computed percentage of 'violence' for each media asset in the second set of media assets, control circuitry 404 may recommend the 'The Dark Knight' to the user as the next media asset.

At 734, control circuitry 404 generates for display a second recommendation of the second media asset. For example, the recommendation may be provided as an alert to the user device 102 associated with the user.

At decision block 736, control circuitry 404 determines that the user consumes the second media asset. Upon determining that the user has consumed the second media asset 'The Dark Knight' 108, control circuitry 404 moves process 700 to 738 to increase the likelihood of the user watching the target media asset to a value greater than the target likelihood. In case control circuitry 404 determines that the user has not consumed the second media asset 'The Dark Knight' 108, control circuitry 404 moves process 700 to 742 to end the process.

At 738, control circuitry 404 increases the likelihood of the user watching the target media asset to a value greater than the target likelihood. For example, control circuitry 404 may increase the likelihood that the user will watch 'American Psycho' 110 from 50% to 77%.

At 740, control circuitry 404 recommends the target media asset to the user. For example, based on the increase of the likelihood of watching 'American Psycho' from 50% to 77%, control circuitry 404 may recommend the movie 'American Psycho' 110 to the user for consumption.

Figure 8:
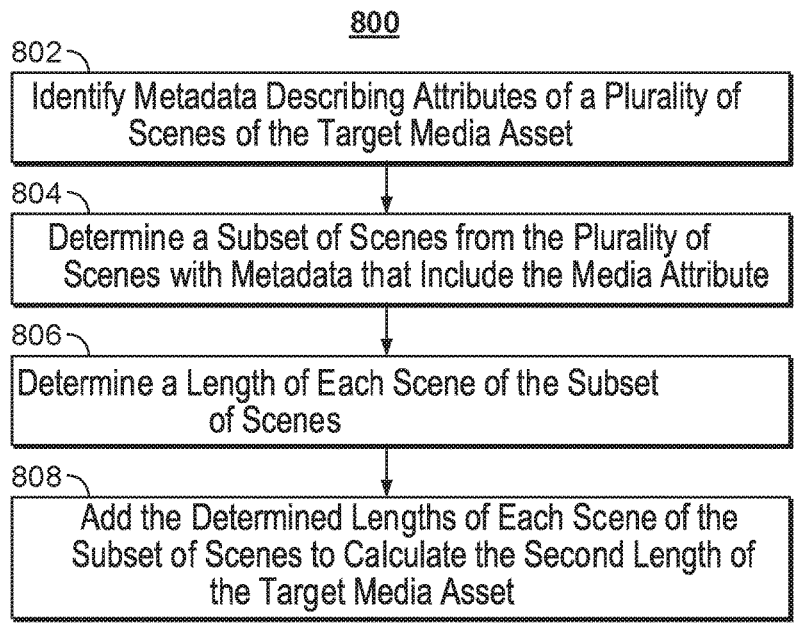
FIG. 8 depicts an illustrative flowchart of a process for quantifying an amount of an attribute present in a media asset, in accordance with some embodiments of the disclosure.

FIG. 8 depicts an illustrative flowchart of a process for quantifying an amount of an attribute present in a media asset, in accordance with some embodiments of the disclosure. Process 800 may be executed by control circuitry 404 (e.g., in a manner instructed to control circuitry 404 by the media guidance application). In addition, one or more steps of process 800 may be incorporated into or combined with one or more steps of any other process or embodiment (e.g., as described in relation to FIGS. 6-7 and 9-12).

Process 800 starts at 802, where control circuitry 404 identifies metadata describing attributes of a plurality of scenes of the target media asset. Each scene in the media asset may have metadata associated with it. The metadata associated with each scene may indicate attributes highlighted in the scene. For example, the metadata associated with scenes in the movie 'American Psycho' 110 may include identifiers of the scene like 'action', 'romance', 'violence', 'drama' etc. In some embodiments, the metadata may be programmed in the movie by the movie provider.

At 804, control circuitry 404 determines a subset of scenes from the plurality of scenes with metadata that include the media attribute. For example, control circuitry 404 may determine a subset of scenes of the movie 'American Psycho' 110 that are all associated with the media attribute 'violence' that is not associated with the user profile in storage 408.

At 806, control circuitry 404 determines a length of each scene of the subset of scenes. For example, control circuitry 404 may determine the length of each scene in the subset of scenes of 'American Psycho' 110 that are associated with the label of 'violence'.

At 808, control circuitry 404 adds the determined lengths of each scene of the subset of scenes to calculate the second length of the target media asset. For example, control circuitry 404 adds the length of each of the scenes to determine a length of the 'violent' portion of the movie. In this example, control circuitry 404 may determine that the 'American Psycho' has 45 minutes of 'violence'.

Figure 9:
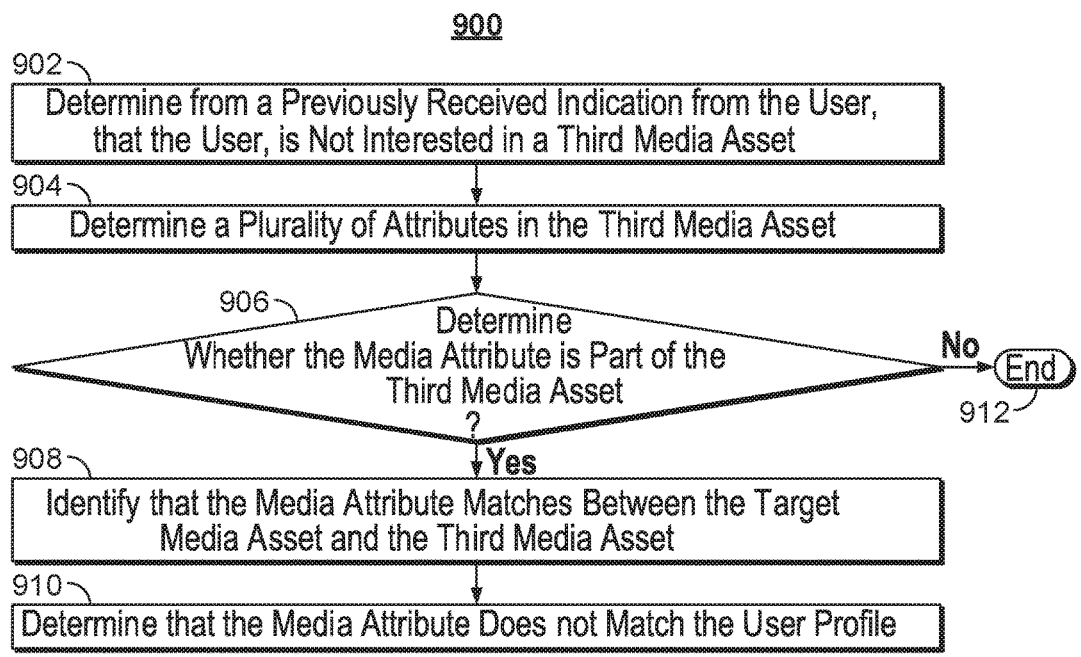
FIG. 9 depicts an illustrative flowchart of a process for determining that the media attribute does not match the user profile, in accordance with some embodiments of the disclosure.

FIG. 9 depicts an illustrative flowchart of a process for determining that the media attribute does not match the user profile, in accordance with some embodiments of the disclosure. Process 900 may be executed by control circuitry 404 (e.g., in a manner instructed to control circuitry 404 by the media guidance application). In addition, one or more steps of process 900 may be incorporated into or combined with one or more steps of any other process or embodiment (e.g., as described in relation to FIGS. 6-8 and 10-12).

Process 902 begin at 902, where control circuitry 404 determines from a previously received indication from the user, that the user is not interested in a third media asset. For example, while the user has not seen 'American Psycho' 110 previously, the user may have seen a different movie like 'Silence of the Lambs' and disliked it. The preference may be recorded in storage 408 of control circuitry 404.

At 904, control circuitry 404 determines plurality of attributes in the third media asset. For example, control circuitry 404 determines that the movie 'Silence of the Lambs' has many attributes like 'drama', 'classic', violence' etc. associated with the metadata of the movie.

At decision block 906, control circuitry 404 determines whether the media attribute is part of the third media asset. For example, control circuitry 404 may determine that the attribute of 'violence' in the movie the 'Silence of the Lambs is a dominating attribute and therefore may designate 'Silence of the Lambs' to be a 'violent' movie, based on the metadata associated with the movie. In case control circuitry 404 determines that the media attribute ('violence') is part of the third media asset ('Silence of the Lambs'), control circuitry 404 proceeds to 908 to identify that the media attribute matches between the target media asset and the third media asset. In case control circuitry 404 determines that the media attribute ('violence') is not part of the third media asset ('Silence of the Lambs'), process 900 proceeds 912 to end.

At 908, control circuitry 404 identifies that the media attribute matches between the target media asset and the third media asset. For example, given that control circuitry 404 has determined that the movie 'Silence of the Lambs' is 'violent', control circuitry 404 determines that the media attribute of 'violence' matches between the 'American Psycho' 110 and 'Silence of the Lambs.'

At 910, control circuitry 404 determines that the media attribute does not match the user profile.

Figure 10:
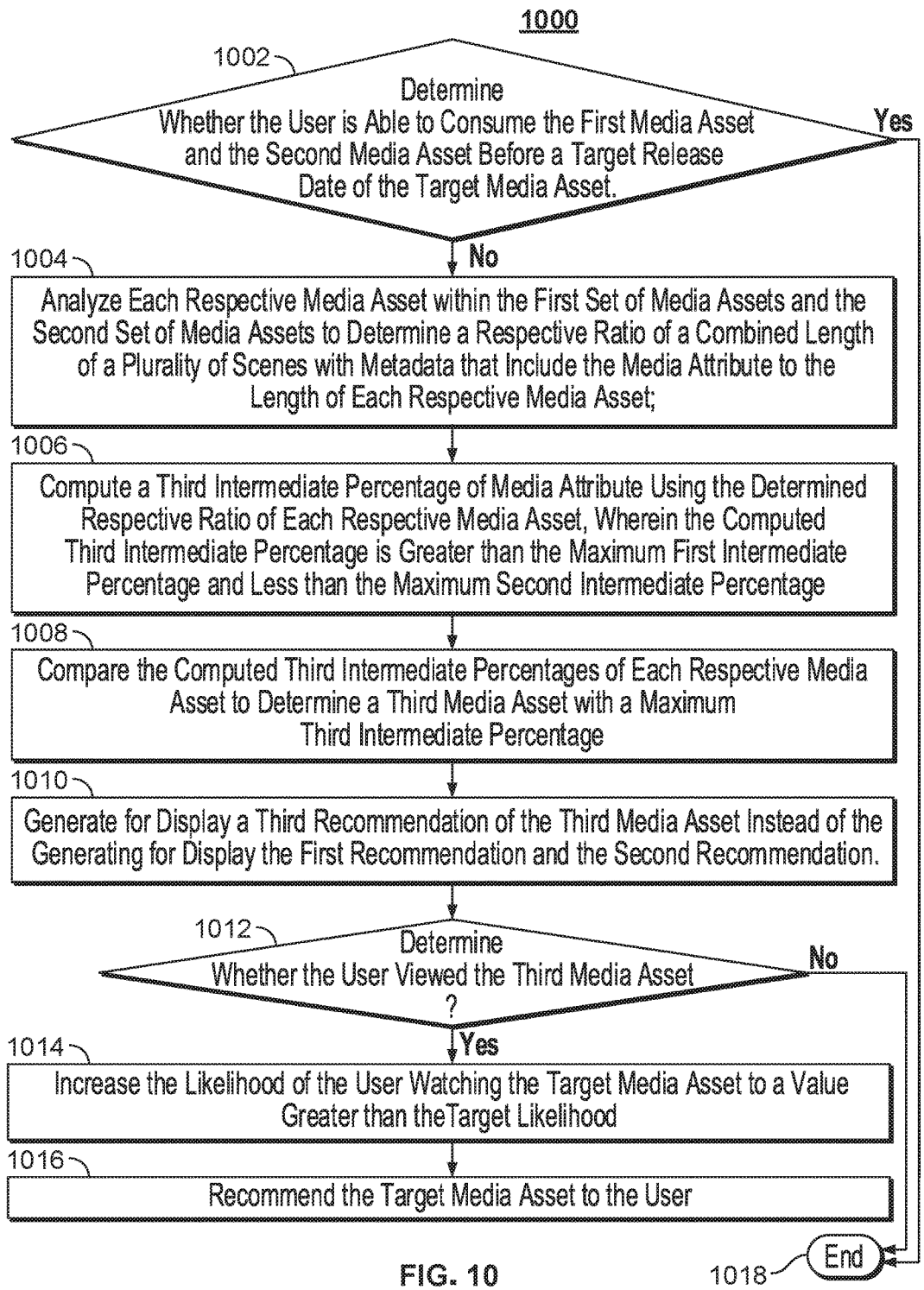
FIG. 10 depicts an illustrative flowchart of a process for reducing a size of the recommendation chain leading to a target media asset, in accordance with some embodiments of the disclosure.

FIG. 10 depicts an illustrative flowchart of a process for reducing a size of the recommendation chain leading to a target media asset, in accordance with some embodiments of the disclosure. Process 1000 may be executed by control circuitry 404 (e.g., in a manner instructed to control circuitry 404 by the media guidance application). In addition, one or more steps of process 1000 may be incorporated into or combined with one or more steps of any other process or embodiment (e.g., as described in relation to FIGS. 6-9 and 11-12).

Process 1000 begins at decision block 1002, where control circuitry 404 determines whether the user is able to consume the first media asset and the second media asset before a target release date of the target media asset. For example, control circuitry 404 may determine that the movie 'American Psycho' 110 is being made available to the user on Mar. 2, 2018 according to the ticker 112 displayed on user device 102. Control circuitry 404 may also determine that the user watches 1 hour of television a day. Therefore, the user may not be able to consume both movies in the given period of time before the 'American Psycho' 110 is made available to the user. In case the user is able to consume the first media asset and the second media asset before the target release date, process 1000 moves to 1018 to end. In case the user is unable to consume the first media asset and the second media asset before the target release date, process 1000 moves to 1004 to analyze each respective media asset within the first set of media assets and the second set of media assets to determine a respective ratio of a combined length of a plurality of scenes with metadata that include the media attribute to the length of each respective media asset.

At 1004, control circuitry 404 analyzes each respective media asset within the first set of media assets and the second set of media assets to determine a respective ratio of a combined length of a plurality of scenes with metadata that include the media attribute to the length of each respective media asset. For example, upon determining that the user may not be able to watch 'The Prestige' 106 and 'The Dark Knight' 108 before the 'American Psycho' 110 is available to the user, control circuitry 404 may search through the first set of media assets and the second set of media assets to determine the ratio of the length of 'violent' scenes in a movie to the length of the movie for each movie in the first set and the second set. In this example, the remainder of the first set and the second set of movies together include movies like "Toy Story', 'Cast Away', 'You Have Got Mail', 'Forrest Gump', 'Memento', and 'Now You See Me.'

At 1006, control circuitry 404 computes a third intermediate percentage of media attribute using the determined respective ratio of each respective media asset, wherein the computed third intermediate percentage is greater than the maximum first intermediate percentage and less than the maximum second intermediate percentage. For example, as described previously, control circuitry 404 may determine that in the first set of media assets, the movie You Have Got Mail' has no 'violence' (0%), the movie 'Toy Story' is an animated movie with 2% 'violence', the movie 'Forrest Gump' has 4% 'violence', and the movie 'Cast Away' has 5% 'violence.' Additionally, control circuitry 404 may determine that in the second set of movies, the movie the movie 'Memento' is a movie with 30% 'violence' and the movie 'Now You See Me' has 25% 'violence.'

At 1008, control circuitry 404 compares the computed third intermediate percentages of each respective media asset to determine a third media asset with a maximum third intermediate percentage. For example, based on the computed percentage of the presence of 'violence' in each of the movies in the first set of movies and the second set of movies, control circuitry 404 selects the movie 'Memento' as that movie has the highest percentage of 'violence' among the remaining movies in the first set and the second set.

At 1010, control circuitry 404, generates for display a third recommendation of the third media asset instead of the generating for display the first recommendation and the second recommendation. For example, upon determining that the user does not have enough time to watch both 'The Prestige' 106 and 'The Dark Knight' 108 before the 'American Psycho' 110, control circuitry 404 recommends the movie 'Memento' to the user.

At decision block 1012, control circuitry 404 determines that the user viewed the third media asset. For example, upon determining that the user has watched the movie 'Memento' instead of the movies 'The Prestige' 106, and 'The Dark Knight' 108, control circuitry 404 proceeds process 1000 to 1014 to increase the likelihood of the user watching the target media asset to a value greater than the target likelihood. In case control circuitry 404 determines that the user did not watch the third media asset 'Memento', control circuitry 404 proceeds to 1018 to end process 1000.

At 1014, control circuitry 404 increases the likelihood of the user watching the target media asset to a value greater than the target likelihood. For example, upon determining that the user has watched the movie 'Memento' instead of the movies 'The Prestige', and 'The Dark Knight', control circuitry 404 may reevaluate and increase the likelihood that the user will watch the 'American Psycho' 110 above the target threshold of 75%. Once the likelihood that the user will watch the 'American Psycho' is past the target threshold of 75%

At 1016, control circuitry 404, recommends the target media asset to the user. For example, when control circuitry 404 determines that the likelihood that the user will watch the 'American Psycho' 110 increases above the target threshold of 75%, control circuitry 404 recommends the 'American Psycho' 110 to the user.

Figure 11:
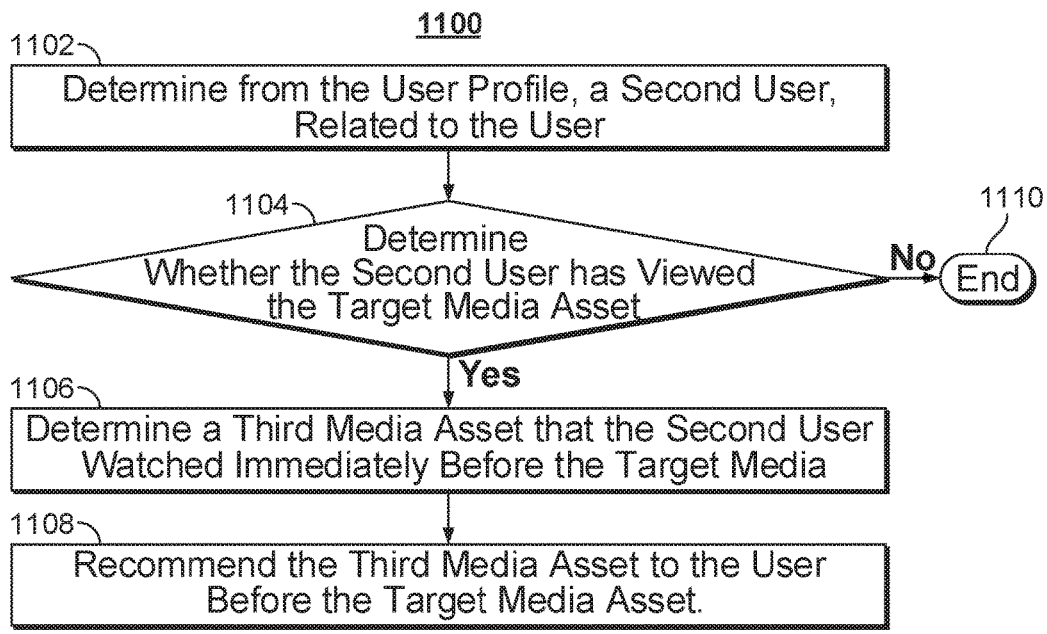
FIG. 11 depicts an illustrative flowchart of a process for generating a recommendation chain leading to a target media asset using viewing history of a second user, in accordance with some embodiments of the disclosure.

FIG. 11 depicts an illustrative flowchart of a process for generating a recommendation chain leading to a target media asset using viewing history of a second user, in accordance with some embodiments of the disclosure. Process 1100 may be executed by control circuitry 404 (e.g., in a manner instructed to control circuitry 404 by the media guidance application). In addition, one or more steps of process 1100 may be incorporated into or combined with one or more steps of any other process or embodiment (e.g., as described in relation to FIGS. 6-10 and 12).

Process 1100 begins at 1102, where control circuitry 404 determines from the user profile, a second user, related to the user. For example, control circuitry 404 may determine a second user that may be a friend of the first user related to the user via a social network. The second user may have provided the user with access to their viewing history.

At decision block 1104, control circuitry 404 determines whether the second user has viewed the target media asset. For example, using the viewing history provided by the second user to the first user, control circuitry 404 may determine whether the second user has watched 'American Psycho' 110. In case control circuitry 404 determines that the second user has viewed the target media asset, control circuitry 404 moves process 1100 to 1106 to determine a third media asset that the second user watched immediately before the target media asset. In case control circuitry 404 determines that the second user has not viewed the target media asset, control circuitry 404 proceeds to 1110 to end.

At 1106, control circuitry 404 determines a third media asset that the second user watched immediately before the target media asset. For example, once control circuitry 404 determines that the user has watched 'American Psycho' 110, control circuitry 404 may determine, from the viewing history of the second user, the media asset the second user consumed just before the 'American Psycho' 110.

At 1108, control circuitry 404 recommends the third media asset to the user before the target media asset. For example, control circuitry 404 and recommends the media asset determined that the second user watched before 'American Psycho' 110 to the user.

Figure 12:
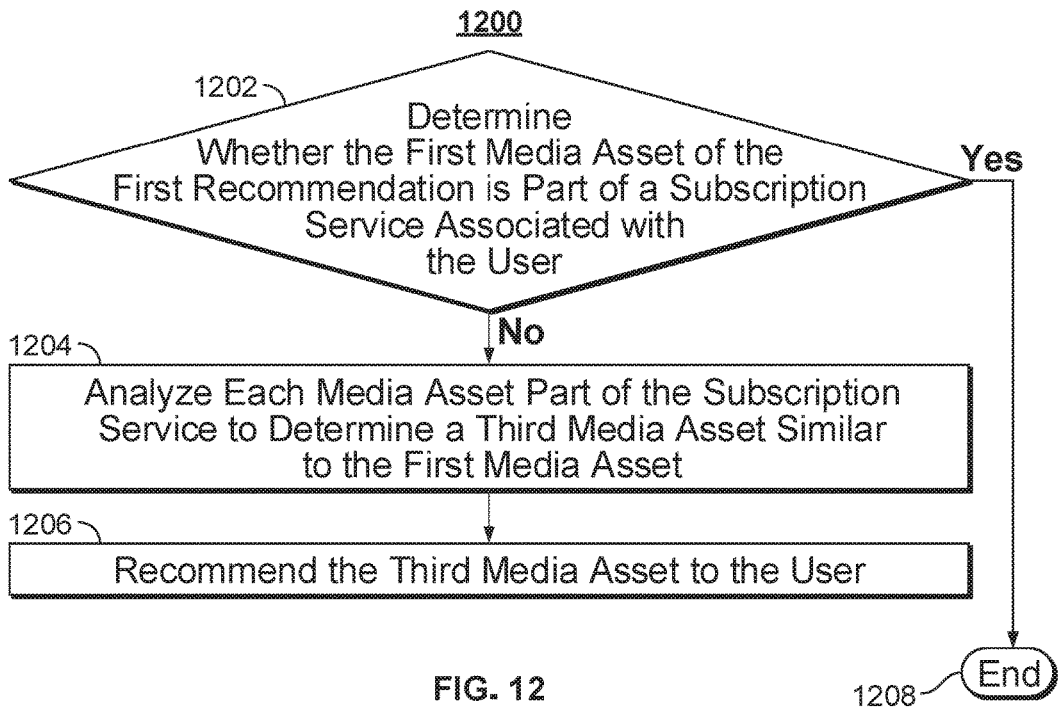
FIG. 12 depicts an illustrative flowchart of a process for recommending a third media asset leading to a target media asset, in accordance with some embodiments of the disclosure.

FIG. 12 depicts an illustrative flowchart of a process for recommending a third media asset leading to a target media asset, in accordance with some embodiments of the disclosure. Process 1200 may be executed by control circuitry 404 (e.g., in a manner instructed to control circuitry 404 by the media guidance application). In addition, one or more steps of process 1200 may be incorporated into or combined with one or more steps of any other process or embodiment (e.g., as described in relation to FIGS. 6-11).

Process 1200 begins at decision block 1202, where control circuitry 404 determines whether the first media asset of the first recommendation is part of a subscription service associated with the user. For example, upon recommending the movie 'The Prestige' 106, control circuitry 404 determines whether 'The Prestige' easily accessible to the user through their video on demand subscription, or as part of their television network service. In case control circuitry 404 determines 'The Prestige' 106 is part of a subscription service associated with the user, the process 1200 proceeds to 1208 to end the process. In case control circuitry 404 determines that 'The Prestige' 106 is not part of the subscription service associated with the surface, process 1200 proceeds to 1204 to analyze each media asset part of the subscription service to determine a third media asset similar to the first media asset.

At 1204, control circuitry 404, analyzes each media asset part of the subscription service to determine a third media asset similar to the first media asset. The search for a similar movie may include finding a match on parameters such as actors, directors, length, genre, a length of various attributes (Thriller, Drama, Violence, Action, Romance) among others. In some embodiments, control circuitry 404 may select a different movie by the same director Christopher Nolan, like 'Interstellar', or 'Inception', that has approximately the same amount of 'violence' as 'The Prestige' 106. In some embodiments, control circuitry 404 may select a movie by an entirely different director and cast, but with approximately the same level of 'violence' in the film, like 'Pirates of Caribbean.'

At 1206, control circuitry 404 recommends the third media asset to the user. For example, control circuitry 404 may recommend the third media asset 'Pirates of the Caribbean' to the user.

What is claimed is:

1. A method for increasing a likelihood above a target threshold of a user watching a target media asset, the method comprising:
    selecting a target media asset to recommend to a user;
    determining a likelihood of the user watching the target media asset;
    determining a set of media attributes present in the target media asset;
    identifying a media attribute from the set of media attributes present in the target media asset that does not match a user profile;
    determining a first length of the target media asset;
    determining a second length of a portion of the target media asset in which the media attribute is present;
    computing a ratio of the first length to the second length to determine a percentage of the media attribute present in the target media asset;
    determining a first set of media assets with a likelihood of the user watching each media asset in the first set of media assets that is above a target threshold;
    analyzing each media asset within the first set of media assets to determine, for each media asset within the first set of media assets, a first respective ratio of a length of the media asset in which the media attribute is present to a total length of the media asset;
    computing, for each media asset within the first set of media assets, a first intermediate percentage of the media attribute present in the media asset based on the first respective ratio determined for the media asset;
    comparing the computed first intermediate percentages of each media asset of the first set of media assets to determine a first media asset with a maximum first intermediate percentage of the media attribute less than the percentage by a first threshold;
    generating for display a first recommendation of the first media asset; and
    in response to determining that the user has consumed the first media asset;
    increasing the likelihood of the user watching the target media asset to an intermediate value greater than the determined likelihood and less than the target likelihood;
    determining a second set of media assets related to the first media asset;
    analyzing each media asset within the second set of media assets to determine, for each media asset within the second set of media assets, a second respective ratio of a length of the media asset in which the media attribute is present to a total length of the media asset;
    computing, for each media asset within the second set of media assets, a second intermediate percentage of the media attribute present in the media asset based on the second respective ratio determined for the media asset, wherein the second intermediate percentage is greater than the maximum first intermediate percentage;
    comparing the computed second intermediate percentages of each media asset within the second set of media assets to determine a second media asset with a maximum second intermediate percentage;
    generating for display a second recommendation of the second media asset; and
    in response to determining that the user consumes the second media asset:
        increasing the likelihood of the user watching the target media asset to a value greater than the target likelihood; and
    in response to the increased likelihood, recommending the target media asset to the user.

2. The method of claim 1, wherein determining the second length of the portion of the target media asset in which the media attribute is present further comprises:
    identifying metadata describing attributes of a plurality of scenes of the target media asset;
    determining a subset of scenes from the plurality of scenes with metadata that include the media attribute;
    determining a length of each scene of the subset of scenes; and
    adding the determined lengths of each scene of the subset of scenes to calculate the second length of the target media asset.

3. The method of claim 1, wherein identifying the media attribute from the set of media attributes present in the target media asset that does not match the user profile further comprises:
    determining from a previously received indication from the user, that the user is not interested in a third media asset;
    determining a plurality of attributes in the third media asset;
    comparing the plurality of attributes in the third media asset to the media attribute to determine whether the media attribute is part of the third media asset; and
    based on the comparison, identifying that the media attribute matches between the target media asset and the third media asset.

4. The method of claim 3, further comprising:
    based on the comparison of the plurality of attributes in the third media asset to the media attribute, determining that the media attribute is part of the third media asset; and
    in response to determining that the media attribute is part of the third media asset, determining that the media attribute does not match the user profile.

5. The method of claim 4, wherein increasing the likelihood of the user watching the target media asset further comprises:
in response to determining that the user has viewed the first media asset and the second media asset:
reevaluating a second likelihood that the user is interested in the third media asset;
determining that the second likelihood is above the target threshold; and
in response to determining that the second likelihood is above the target threshold, reversing an indication related to the media attribute in the user profile to state that the media attribute matches the user profile.

6. The method of claim 1, further comprising:
based on a viewing pattern of the user associated with the user profile, determining whether the user is able to consume the first media asset and the second media asset before a target release date of the target media asset.

7. The method of claim 6, further comprising:
in response to determining that the user is unable to consume the first media asset and the second media asset before the target release date of the target media asset:
analyzing each respective media asset within the first set of media assets and the second set of media assets to determine, for the respective media asset within the first set of media assets and the second set of media assets, a respective ratio of a combined length of a plurality of scenes of the media asset with metadata that include the media attribute to a total length of the respective media asset;
computing a third intermediate percentage of media attribute using the determined respective ratio of each respective media asset, wherein the computed third intermediate percentage is greater than the maximum first intermediate percentage and less than the maximum second intermediate percentage;
comparing the computed third intermediate percentages of each respective media asset to determine a third media asset with a maximum third intermediate percentage; and
generating for display a third recommendation of the third media asset instead of the generating for display the first recommendation and the second recommendation.

8. The method of claim 7, further comprising:
in response to determining that the user viewed the third media asset:
increasing the likelihood of the user watching the target media asset to a value greater than the target likelihood; and
in response to the increased likelihood, recommending the target media asset to the user.

9. The method of claim 1, wherein determining the first recommendation and the second recommendation further comprise:
determining from the user profile, a second user, related to the user;
determining whether the second user has viewed the target media asset; and
in response to determining that the second user has viewed the target media asset:
determining a third media asset that the second user watched immediately before the target media asset; and
recommending the third media asset to the user before the target media asset.

10. The method of claim 1, wherein analyzing each media asset within the first set of media assets further comprises:
determining whether the first media asset of the first recommendation is part of a subscription service associated with the user; and
in response to determining that the first media asset of the first recommendation is not part of the subscription service:
analyzing each media asset part of the subscription service to determine a third media asset similar to the first media asset; and
recommending the third media asset to the user.

11. A system for increasing a likelihood above a target threshold of a user watching a target media asset, the system comprising:
control circuitry configured to:
select a target media asset to recommend to a user;
determine a likelihood of the user watching the target media asset;
determine a set of media attributes present in the target media asset;
identify a media attribute from the set of media attributes present in the target media asset that does not match a user profile;
determine a first length of the target media asset;
determine a second length of a portion of the target media asset in which the media attribute is present;
compute a ratio of the first length to the second length to determine a percentage of the media attribute present in the target media asset;
determine a first set of media assets with a likelihood of the user watching each media asset in the first set of media assets that is above a target threshold;
analyze each media asset within the first set of media assets to determine, for each media asset within the first set of media assets, a first respective ratio of a length of the media asset in which the media attribute is present to a total length of the media asset;
compute, for each media asset within the first set of media assets, a first intermediate percentage of the media attribute present in the media asset based on the first respective ratio determined for the media asset;
compare the computed first intermediate percentages of each media asset of the first set of media assets to determine a first media asset with a maximum first intermediate percentage of the media attribute less than the percentage by a first threshold;
generate for display a first recommendation of the first media asset; and
in response to determining that the user has consumed the first media asset:
increase the likelihood of the user watching the target media asset to an intermediate value greater than the determined likelihood and less than the target likelihood;
determine a second set of media assets related to the first media asset;
analyze each media asset within the second set of media assets to determine, for each media asset within the second set of media assets, a second respective ratio of a length of the media asset in which the media attribute is present to a total length of the media asset;
compute, for each media asset within the second set of media assets, a second intermediate percentage of the media attribute present in the media asset based on the second respective ratio determined for the media asset, wherein the second intermediate percentage is greater than the maximum first intermediate percentage;

compare the computed second intermediate percentages of each media asset within the second set of media assets to determine a second media asset with a maximum second intermediate percentage;

generate for display a second recommendation of the second media asset; and in response to determining that the user consumes the second media asset:
 increase the likelihood of the user watching the target media asset to a value greater than the target likelihood; and
 in response to the increased likelihood, recommend the target media asset to the user.

12. The system of claim 11, wherein the control circuitry configured to determine the second length of the portion of the target media asset in which the media attribute is present is further configured to:
 identify metadata describing attributes of a plurality of scenes of the target media asset;
 determine a subset of scenes from the plurality of scenes with metadata that include the media attribute;
 determine a length of each scene of the subset of scenes; and
 add the determined lengths of each scene of the subset of scenes to calculate the second length of the target media asset.

13. The system of claim 11, wherein the control circuitry configured to identify the media attribute from the set of media attributes present in the target media asset that does not match the user profile is further configured to:
 determine from a previously received indication from the user, that the user is not interested in a third media asset;
 determine a plurality of attributes in the third media asset;
 compare the plurality of attributes in the third media asset to the media attribute to determine whether the media attribute is part of the third media asset; and
 based on the comparison, identify that the media attribute matches between the target media asset and the third media asset.

14. The system of claim 13, wherein the control circuitry is further configured to:
 based on the comparison of the plurality of attributes in the third media asset to the media attribute, determine that the media attribute is part of the third media asset; and
 in response to determining that the media attribute is part of the third media asset, determine that the media attribute does not match the user profile.

15. The system of claim 14, wherein the control circuitry configured to increase the likelihood of the user watching the target media asset is further configured to:
 in response to determining that the user has viewed the first media asset and the second media asset:
 reevaluate a second likelihood that the user is interested in the third media asset;
 determine that the second likelihood is above the target threshold; and
 in response to determining that the second likelihood is above the target threshold, reverse an indication related to the media attribute in the user profile to state that the media attribute matches the user profile.

16. The system of claim 11, wherein the control circuitry is further configured to:
 based on a viewing pattern of the user associated with the user profile, determine whether the user is able to consume the first media asset and the second media asset before a target release date of the target media asset.

17. The system of claim 16, wherein the control circuitry is further configured to:
 in response to determining that the user is unable to consume the first media asset and the second media asset before the target release date of the target media asset:
 analyze each respective media asset within the first set of media assets and the second set of media assets to determine, for the respective media asset within the first set of media assets and the second set of media assets, a respective ratio of a combined length of a plurality of scenes of the media asset with metadata that include the media attribute to a total length of the respective media asset;
 compute a third intermediate percentage of media attribute using the determined respective ratio of each respective media asset, wherein the computed third intermediate percentage is greater than the maximum first intermediate percentage and less than the maximum second intermediate percentage;
 compare the computed third intermediate percentages of each respective media asset to determine a third media asset with a maximum third intermediate percentage; and
 generate for display a third recommendation of the third media asset instead of the generating for display the first recommendation and the second recommendation.

18. The system of claim 17, wherein the control circuitry is further configured to:
 in response to determining that the user viewed the third media asset:
 increase the likelihood of the user watching the target media asset to a value greater than the target likelihood; and
 in response to the increased likelihood, recommend the target media asset to the user.

19. The system of claim 11, wherein the control circuitry configured to determine the first recommendation and the second recommendation is further configured to:
 determine from the user profile, a second user, related to the user;
 determine whether the second user has viewed the target media asset; and
 in response to determining that the second user has viewed the target media asset:
 determine a third media asset that the second user watched immediately before the target media asset; and
 recommend the third media asset to the user before the target media asset.

20. The system of claim 11, wherein the control circuitry configured to analyze each media asset within the first set of media assets is further configured to:
 determine whether the first media asset of the first recommendation is part of a subscription service associated with the user; and
 in response to determining that the first media asset of the first recommendation is not part of the subscription service:
 analyze each media asset part of the subscription service to determine a third media asset similar to the first media asset; and
 recommend the third media asset to the user.

* * * * *